United States Patent
Knight-Rubino et al.

(10) Patent No.: US 11,656,172 B1
(45) Date of Patent: May 23, 2023

(54) MULTICHANNEL ANGULAR SPECTROMETER

(71) Applicant: Photonics Automation Specialties LLC, Tucson, AZ (US)

(72) Inventors: Gerard Knight-Rubino, Tucson, AZ (US); Xiyao Zhang, Tucson, AZ (US)

(73) Assignee: Photonics Automation Specialties LLC, Tucson, AZ (US)

( * ) Notice: Subject to any disclaimer, the term of this patent is extended or adjusted under 35 U.S.C. 154(b) by 137 days.

(21) Appl. No.: 17/335,921

(22) Filed: Jun. 1, 2021

(51) Int. Cl.
*G01N 21/31* (2006.01)

(52) U.S. Cl.
CPC ..... *G01N 21/31* (2013.01); *G01N 2201/0635* (2013.01); *G01N 2201/0638* (2013.01); *G01N 2201/08* (2013.01)

(58) Field of Classification Search
CPC ............. G01N 21/31; G01N 33/18; G01N 2201/0635; G01N 2201/0638; G01N 2201/08
See application file for complete search history.

(56) References Cited

U.S. PATENT DOCUMENTS

| | | | |
|---|---|---|---|
| 5,404,218 A * | 4/1995 | Nave | G01N 21/65 356/246 |
| 7,920,252 B2 * | 4/2011 | Hu | G01N 21/31 356/73 |
| 2016/0265974 A1 * | 9/2016 | Ertel | G01J 3/0256 |
| 2021/0404875 A1 * | 12/2021 | Schwab | G01N 21/6408 |

OTHER PUBLICATIONS

"About Argo", https://argo.ucsd.edu/about/, accessed Jul. 20, 2021, 8 pgs.
Babin, et al., "Determination of the volume scattering function of aqueous particle suspensions with a laboratory multi-angle light scattering instrument", Applied Optics, vol. 51, No. 17, Jun. 10, 2012, pp. 3853-3873, 21 pgs.
Battery Systems, http://www.sarind.com/products.php?cat=10, accessed Jul. 20, 2021, 2 pgs.
Berthon et al., "Measurements and modeling of the volume scattering function in the coastal northern Adriatic Sea", Applied Optics, vol. 46, No. 22, Aug. 1, 2007, pp. 5189-5203, 15 pgs.
Bishop, "Status of optical sensors for POC and PIC concentration and Flux", University of California Berkeley, Apr. 2009, 25 pgs.

(Continued)

*Primary Examiner* — Hina F Ayub
(74) *Attorney, Agent, or Firm* — Hayes Soloway P.C.

(57) ABSTRACT

A multichannel angular spectrometer includes an array of fiber pickups having an arcuate arrangement and focused about a sample volume. A broadband light source is configured to illuminate a sample within the sample volume. At least one dispersion element is in optical communication with the array of fiber pickups. An imaging sensor is in optical communication with the array of fiber pickups. The imaging sensor is configured to image the broadband light received by the array of fiber pickups and dispersed by the at least one dispersion element. A processor is in electrical communication with the imaging sensor. The processor has a power supply and computer-readable memory.

20 Claims, 13 Drawing Sheets

(56) References Cited

OTHER PUBLICATIONS

Bishop et al., "Robotic Observations of Enhanced Carbon Biomass and Export at 55°S During SOFeX", Science, vol. 304, Apr. 16, 2004, pp. 417-420, 5 pgs.
Bishop et al., "Robotic Observations of Dust Storm Enhancement of Carbon Biomass in the North Pacific", Science, vol. 298, Oct. 25, 2002, pp. 817-821, 6 pgs.
Bishop et al., "Supplemental on Line Materials for: Robotic Observations of Dust Storm Enhancement of Carbon Biomass in the North Pacific", unknown publisher or date, 3 pgs.
Bittig et al., "A BGC-Argo Guide: Planning, Deployment, Data Handling and Usage", Frontiers in Marine Science, vol. 6, Article 502, Aug. 2019, 23 pgs.
Buil, "Spectrography, Detectors and Astronomy", http://www.astrosurf.com/buil/spectrographs.html, accessed. Jul. 20, 2021, 5 pgs.
"Comparing the IMX455 (Industry-Grade) and KAI-11002 35MM Format Monochrome Sensors", Baader Planetarium, https://www.qhyccd.com/index.php?m=content&c=index&a=show&catid=23&id=262, copyright 2019, accessed Jul. 20, 2021, 11 pgs.
DH4 Data Handler, https://www.seabird.com/data-handlers-battery-packs/dh4-data-handler/family?productCatalogId=54627870406, accessed Jul. 20, 2021, 1 pg.
"Federal Research and Development (R&D) Funding: FY 2020", Congressional Research Service, Mar. 2020, 77 pgs.
Feinholz et al., "Stray Light Correction of the Marine Optical System", Journal of Atmospheric and Oceanic Technology, vol. 26, American Meteorological Society, 2009, pp. 57-73, 17 pgs.
"Global Ocean Science Report, The Current Status of Ocean Science around the World," United Nations Educational, Scientific and Cultural Organization, 2017, 18 pgs.
"Global Research and Development Expenditures: Fact Sheet", Congressional Research Service, Apr. 29, 2020, 6 pgs.
Göhler, "Detectors for microscopy—CCDs, sCMOS, APDs and PMTs", unknown publisher, Mar. 2015, 28 pgs.
Gray et al., "Multi Spectral Volume Scattering Meter (MVSM) a.k.a. The Beast", Marine Hydrophysical Institute National Academy Sciences, 2015, 32 pgs.
Hails et al., "The Optical Phytoplankton Discriminator", Conference Paper, IEEE, Nov. 2009, 5 pgs.
Harred et al., "Predicting harmful algal blooms: a case study with *Dinophysis ovum* in the Gulf of Mexico", Journal of Plankton Research, Oxford University Press, 2014, 12 pgs.
"Highlights of the Department of the Navy FY 2019 Budget", Office of Budget 2018, 111 pgs.
Hu et al., "Calibration of the LISST-VSF to Derive the Volume Scattering Functions in Clear Waters", Optics Express 27, No. 16, Aug. 2019, 20 pgs.
HydroScat-6P, Series 300, Spectral Backscattering Sensor & Fluorometer User's Manual, Hobi Instrument Services, Jul. 2014, 59 pgs.
Hyper-bb, Hyper-Spectral Backscatter Instrument brochure, Sequoia Scientific, undated, 2 pgs.
Koestner, et al. "Measurements of the Volume Scattering Function and the Degree of Linear Polarization of Light Scattered by Contrasting Natural Assemblages of Marine Particles", Applied Sciences, vol. 8, Dec. 19, 2018, 32 pgs.
Koestner, et al., "Polarized light scattering measurements as a means to characterize particle size and composition of natural assemblages of marine particles", Applied Optics, vol. 59, No. 27, Sep. 20, 2020, pp. 8314-8334, 21 pgs.
Kokhanovsky, "Parameterization of the Mueller matrix of oceanic waters", Journal of Geophysical Research, vol. 108, No. C6, American Geophysical Union, 2003, 4 pgs.
Lee et al., "A New Method for the Measurement of the Optical Volume Scattering Function in the Upper Ocean", American Meteorological Society, Aug. 29, 2002, pp. 563-571, 9 pgs.
Lewis, "Measurement of in-situ optical properties", Satlantic LP/SeaBird Scientific, Apr. 2012, 117 pgs.
Li et al., "An Instrument for in Situ Measuring the Volume Scattering Function of Water: Design, Calibration and Primary Experiments", Sensors, vol. 12, 2012, pp. 4514-4533, 20 pgs.
LISST-200X, https://www.sequoiasci.com/product/lisst-200x/, accessed Jul. 20, 2021, 3 pgs.
LISST-VSF Multi-angle Polarized Light Scattering Meter User's Manual, Version 3.0, Sequoia, Dec. 2016, 62 pgs.
Lombard et al., "Globally Consistent Quantitative Observations of Planktonic Ecosystems", Frontiers in Marine Science, vol. 6, Article 196, Apr. 2019, 21 pgs.
Lotsberg et al., "Laboratory measurements of scattering by algae and comparison with Mie scattering", Proceedings of SPIE, SPIE Industrial Lasers and Inspection (EUROPTO Series), Sep. 1999, 9 pgs.
Maffione et al., "Instruments and methods for measuring the backward-scattering coefficient of ocean waters", Applied Optics, vol. 36, No. 24, Aug. 1997, pp. 6057-6067, 11 pgs.
Marschner et al., "Image-Based BRDF Measurement Including Human Skin", Cornell University, 1999, 15 pgs.
Mobley, "2017 Summer Course on Optical Oceanography and Ocean Color Remote Sensing", University of Main, Jul. 2017, 45 pgs.
Navis Profiling Float Product Guide, seabird.com, Jan. 2018, 1 pg.
Ocean Innovations website, https://ocean-innovations.net, accessed Jul. 20, 2021, 2 pgs.
Ocean Optics Web Book, https://www.oceanopticsbook.info/, accessed Jul. 27, 2021, 2 pgs.
"Photomultiplier Tubes, Basics and Applications, $3^{rd}$ Edition", Chapter 6—Photon Counting, Hamamatsu Photonics K.K. Editorial Committee, Hamamatsu Photonics K.K., 2007, 25 pgs.
"Photon-Counting Means Sensitivity", Jobin Yvon, Inc., 2000, 2 pgs.
Provor CTS4 Autonomous multisensors oceanographic ARGO profiling float, NKE Instrumentation, date unknown, 2 pgs.
Puussaar, "Requirements and analysis of Multispectral Volume Scattering Meter", University of Tartu, 2011, 40 pgs.
Riser et al., "Profiling Floats in SOCCOM: Technical Capabilities for Studying the Southern Ocean", Journal of Geophysical Research: Oceans, 123, Feb. 2018, pp. 4055-4073, 19 pgs.
"SBE 25plus with Aluminum Housing, 2000dBar pressure sensor, Mcbh Connector, With Cage and Accessories", https://www.seabird.com/sbe-25plus-with-aluminum-housing-2000dbar-pressure-sensor-mcbh-connector-with-cage-and-accessories/product?id=54627774326&callback=qs, accessed Jul. 20, 2012, 2 pgs.
Schaefer et al., "Measuring the Stokes polarization parameters", American Journal of Physics, vol. 75, Feb. 2007, pp. 163-168, 6 pgs.
"Science & Engineering Indicators 2020, Academic Research and Development, Figure 5b-4, 5b-5, Table S5b-1", National Science Board, Jan. 16, 2020, 39 pgs.
"Science & Engineering Indicators Table 5.1", National Science Board, 2018, 5 pgs.
"Science & Engineering Indicators, The State of U.S. Science and Engineering 2020", Figure-16 and Figure-18, National Science Board, 2020, 5 pgs.
"Spectral Absorption and Attenuation Sensor ac-s User's Guide", Sea-Bird Scientific, 2013, 31 pgs.
"Spectrometers, Monochromators and Spectrographs", Horiba Scientific, https://www.horiba.com/en_en/technology/measurement-and-control-techniques/spectroscopy/spectrometers-and-monochromators/spectrometer-monochromator/, accessed Jul. 20, 2021, 5 pgs.
Spring, et al., "Concepts in Digital Imaging Technology, Quantum Efficiency", Hamamatsu, https://hamamatsu.magnet.fsu.edu/articles/quantumefficiency.html, accessed Jul. 20, 2021, 4 pgs.
Stauffer et al., "Considerations in Harmful Algal Bloom Research and Monitoring: Perspectives From a Consensus-Building Workshop and Technology Testing", Frontiers in Marine Science, vol. 6, Article 399, Jul. 2019, 18 pgs.
Sullivan et al., "Angular shape of the oceanic particulate volume scattering function in the backward direction", Applied Optics, vol. 48, No. 35, Dec. 10, 2009, pp. 6811-6819, 9 pgs.
Tan, et al., "A new approach to measure the volume scattering function", Optics Express, vol. 21, No. 16, Aug. 12, 2013, 15 pgs.

(56) References Cited

OTHER PUBLICATIONS

Tyler, "Scattering Properties of Distilled and Natural Waters", Scripps Institution of Oceanography, undated, 6 pgs.

Wang et al., "Assessment of soil surface BRDF using an imaging spectrometer", Proceedings of SPIE, SPIE Remote Sensing, 2010, 10 pgs.

Westwood et al., "Global Ocean Markets", Oceanography, vol. 14, No. 3, 2001, pp. 83-91, 9 pgs.

Wilson, "Understanding camera performance specs", Vision Systems Design, Jun. 30, 2007, 18 pgs.

Winter, "Statement of Rear Admiral Mathias W. Winter, United States Navy Chief of Naval Research", House Armed Services Committee, Mar. 26, 2015, 26 pgs.

YSI EXO1 Water Quality Sonde, Ebay, Nov. 2020, 2 pgs.

Zhang et al., "Comparison of optically derived particle size distributions: scattering over the full angular range versus diffraction at near forward angles", Applied Optics, vol. 51, No. 21, Jul. 20, 2012, pp. 5085-5099, 15 pgs.

Zhang et al., "Interpretation of scattering by oceanic particles around 120 degrees and its implication in ocean color studies", Optics Express, vol. 25, No. 4, Feb. 20, 2017, pp. A191-A199, 9 pgs.

Zhang et al., "Light scattering by pure water and seawater: the depolarization ratio and its variation with salinity", Applied Optics, vol. 58, No. 4, Feb. 1, 2019, pp. 991-1004, 14 pgs.

\* cited by examiner

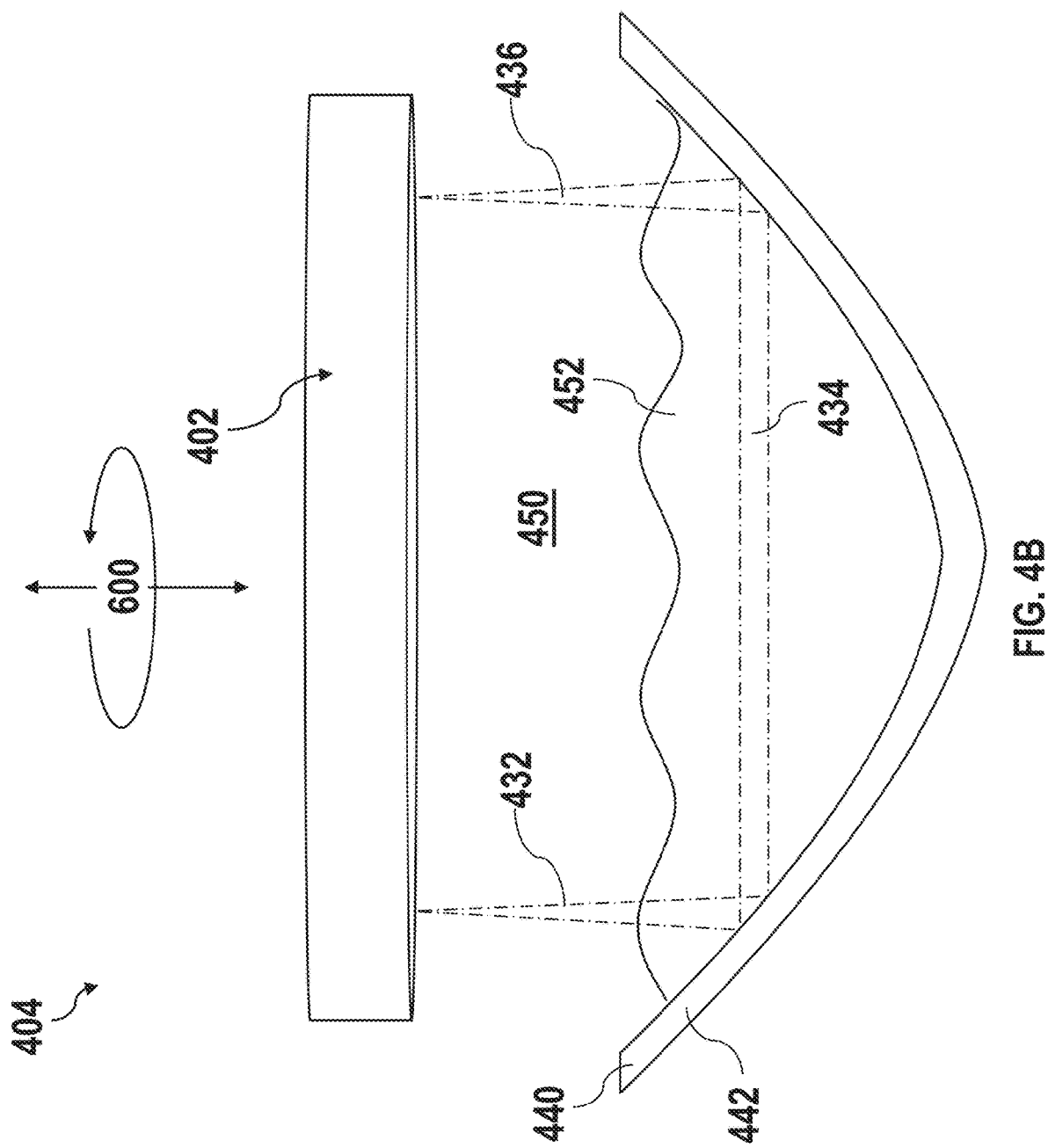

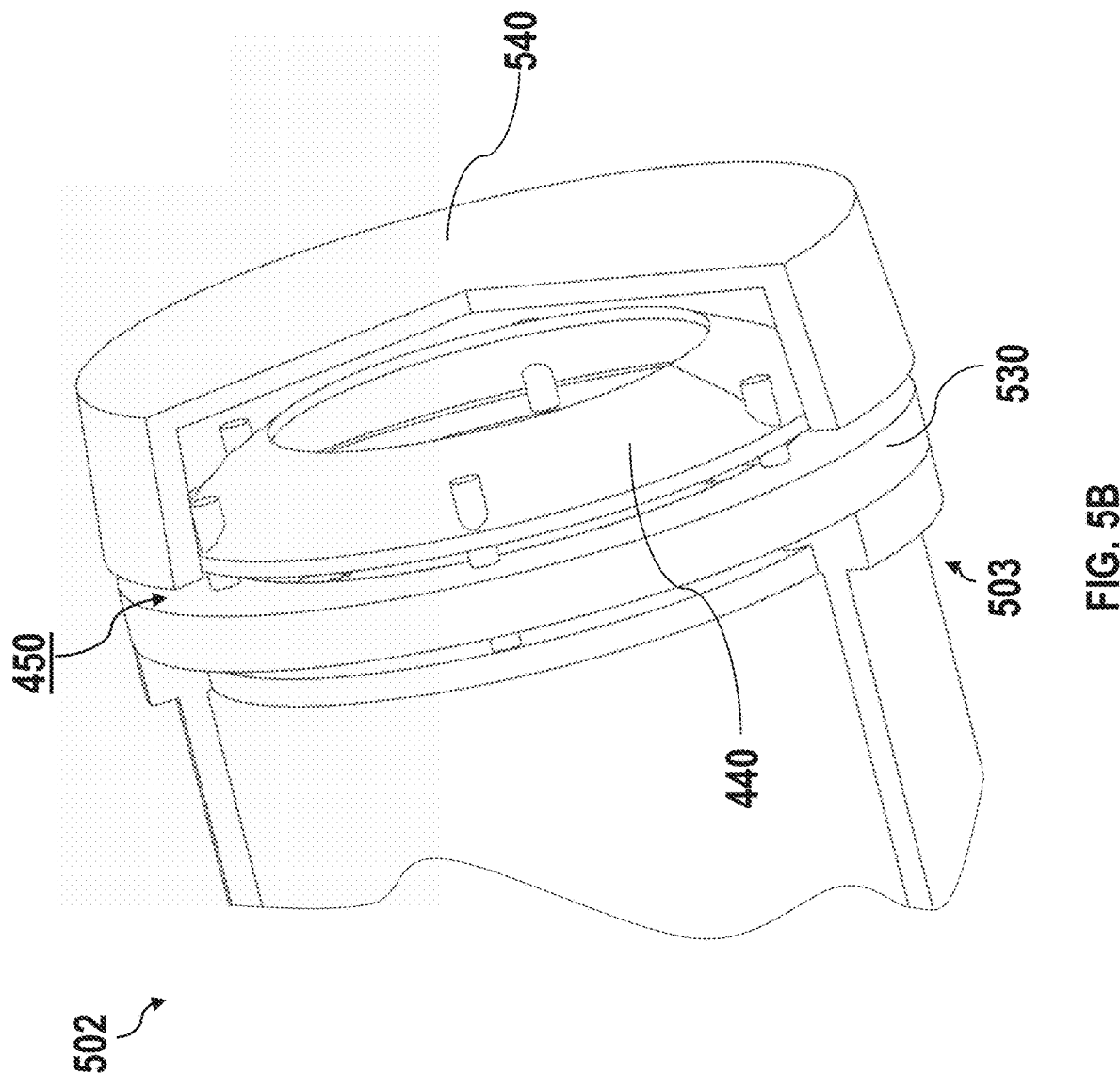

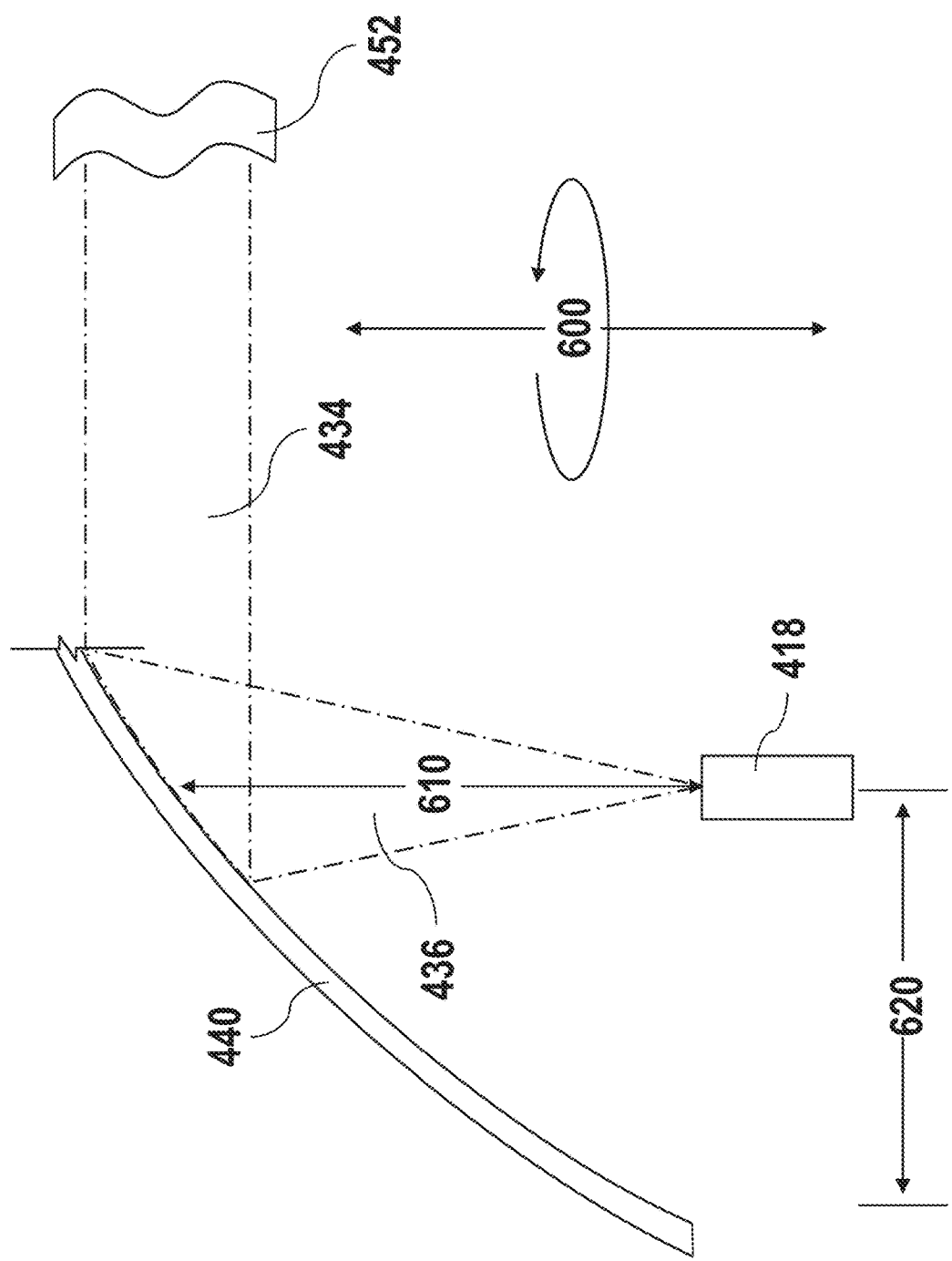

MULTICHANNEL ANGULAR SPECTROMETER

STATEMENT OF GOVERNMENT INTEREST

This invention was made with United States government support under SBIR contract number 80NSSC2000476 awarded by the National Aeronautics and Space Administration (NASA). The United States government has certain rights in this invention.

FIELD OF THE DISCLOSURE

The present disclosure is generally related to multichannel fiber spectrometers and more particularly is related to hyperspectral measurements of the volume scattering function using multichannel fiber spectrometers.

BACKGROUND OF THE DISCLOSURE

In order to understand large-scale changes in our oceans due to environmental factors, climate change, and the like, scientists combine high-level satellite imaging with localized oceanic sensing. Localized sensing requires the acquisition of in-fluid measurements by devices deployed in ocean waters to perform in situ measurements of ocean water characteristics. In particular, measurement of the volume scattering function (VSF) of ocean water describes the ways in which light propagates through ocean water, allowing for the analysis of ocean biology, aerosols and trace gasses, carbon dioxide, and pollution and air quality in the localized regions.

VSF measurements are currently performed in a variety of ways. One particular implementation uses a forward angle scattering measurement instrument paired with a roving eyeball or rotating periscope to collect scattered light at different points along a laser beam. This method of measurement operates over a limited field of view at a single, narrow wavelength. Another method can perform measurements over a broad range of wavelengths, but only at a single angle using backscattered light. With this method, spectral resolution is relatively broad, but is only valid at a single angle. Yet another method is capable of measuring several discrete wavelengths at a single angle using backscattering and fluorescence.

Each of these methods provides only limited information relative to the full VSF of the measured ocean water: limited field of view, limited wavelength range, limited spectral resolution, limited angular coverage, or some combination thereof. In this way, the understanding of ocean water characteristics provided by any given measurement is limited as well. Furthermore, current systems require multiple seconds to complete each measurement, which is too long when in turbulent and dynamic bodies of water.

Thus, a heretofore-unaddressed need exists in the industry to address the aforementioned deficiencies and inadequacies.

SUMMARY OF THE DISCLOSURE

Embodiments of the present disclosure provide an apparatus for multichannel angular spectrometry. Briefly described, in architecture, one embodiment of the apparatus, among others, can be implemented as follows. A multichannel angular spectrometer includes an array of fiber pickups having an arcuate arrangement and focused about a sample volume. A broadband light source is configured to illuminate a sample within the sample volume. At least one dispersion element is in optical communication with the array of fiber pickups. An imaging sensor is in optical communication with the array of fiber pickups. The imaging sensor is configured to image the broadband light received by the array of fiber pickups and dispersed by the at least one dispersion element. A processor is in electrical communication with the imaging sensor. The processor has a power supply and computer-readable memory.

The present disclosure can also be viewed as providing an in-fluid multichannel angular spectrometer apparatus. Briefly described, in architecture, one embodiment of the apparatus, among others, can be implemented as follows. An in-fluid multichannel angular spectrometer includes a housing having a watertight interior volume and an open sample volume. A reflector dish is located within the open sample volume. A reflective face of the reflector dish is curved about an axis of curvature. A broadband light source is located within the watertight interior volume and configured to illuminate a sample within the open sample volume. An emitted beam from the broadband light source propagates in a direction perpendicular to the axis of curvature to illuminate the sample. A plurality of fiber pickups are located within the watertight interior volume and arranged radially about the reflector dish. The plurality of fiber pickups are oriented parallel to the axis of curvature of the reflector dish. The plurality of fiber pickups are configured to receive broadband light scattered by the illuminated sample and reflected by the reflective face of the reflector dish. At least one dispersion element is located within the watertight interior volume and in optical communication with the plurality of fiber pickups. An imaging sensor is located within the watertight interior volume and in optical communication with the plurality of fiber pickups. The imaging sensor is configured to image the broadband light received by the plurality of fiber pickups and dispersed by the at least one dispersion element. A processor is located within the watertight interior volume and in electrical communication with the imaging sensor. The processor has a power supply and computer-readable memory.

The present disclosure can also be viewed as providing methods for measuring light scattered by a fluid sample across an angular range. In this regard, one embodiment of such a method, among others, can be broadly summarized by the following steps: providing the fluid sample to be measured within a sample volume; illuminating the fluid sample using a broadband light source, thereby causing light propagating through the fluid sample to scatter in a plurality of directions; receiving the scattered light through an array of fiber pickups having an arcuate arrangement and focused about the sample volume, wherein the array of fiber pickups are positioned to correspond to values within the angular range; dispersing component wavelengths of the received, scattered light using at least one dispersion element in optical communication with the array of fiber pickups; detecting the dispersed light using an imaging sensor in optical communication with the array of fiber pickups; and computing, using a processor in electrical communication with the imaging sensor, intensity values from each fiber pickup across the angular range for each of the dispersed component wavelengths.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A is a diagrammatic illustration of the optical system of the multichannel angular spectrometer. FIG. 1B is a diagrammatic illustration of the detection and processing systems of the multichannel angular spectrometer.

FIG. 3A illustrates a concave fiber array configuration. FIG. 3B illustrates a convex fiber array configuration.

FIGS. 4A-4B are diagrammatic illustrations of an in-fluid multichannel angular spectrometer, in accordance with a second exemplary embodiment of the present disclosure.

FIG. 4A is an overhead illustration of the optical system of the in-fluid multichannel angular spectrometer. FIG. 4B is a side view illustration of the curved reflector system of the in-fluid multichannel angular spectrometer.

FIGS. 5A-5B are illustrations of the housing of the in-fluid multichannel angular spectrometer in partial cross, in accordance with the second exemplary embodiment of the present disclosure. FIG. 5A illustrates the component systems within the housing. FIG. 5B is a close-up illustration of the curved reflector system within the housing.

FIG. 6 is a cross-sectional diagrammatic illustration of the curved reflector, in accordance with the second exemplary embodiment of the present disclosure.

DETAILED DESCRIPTION

Figure 1A:
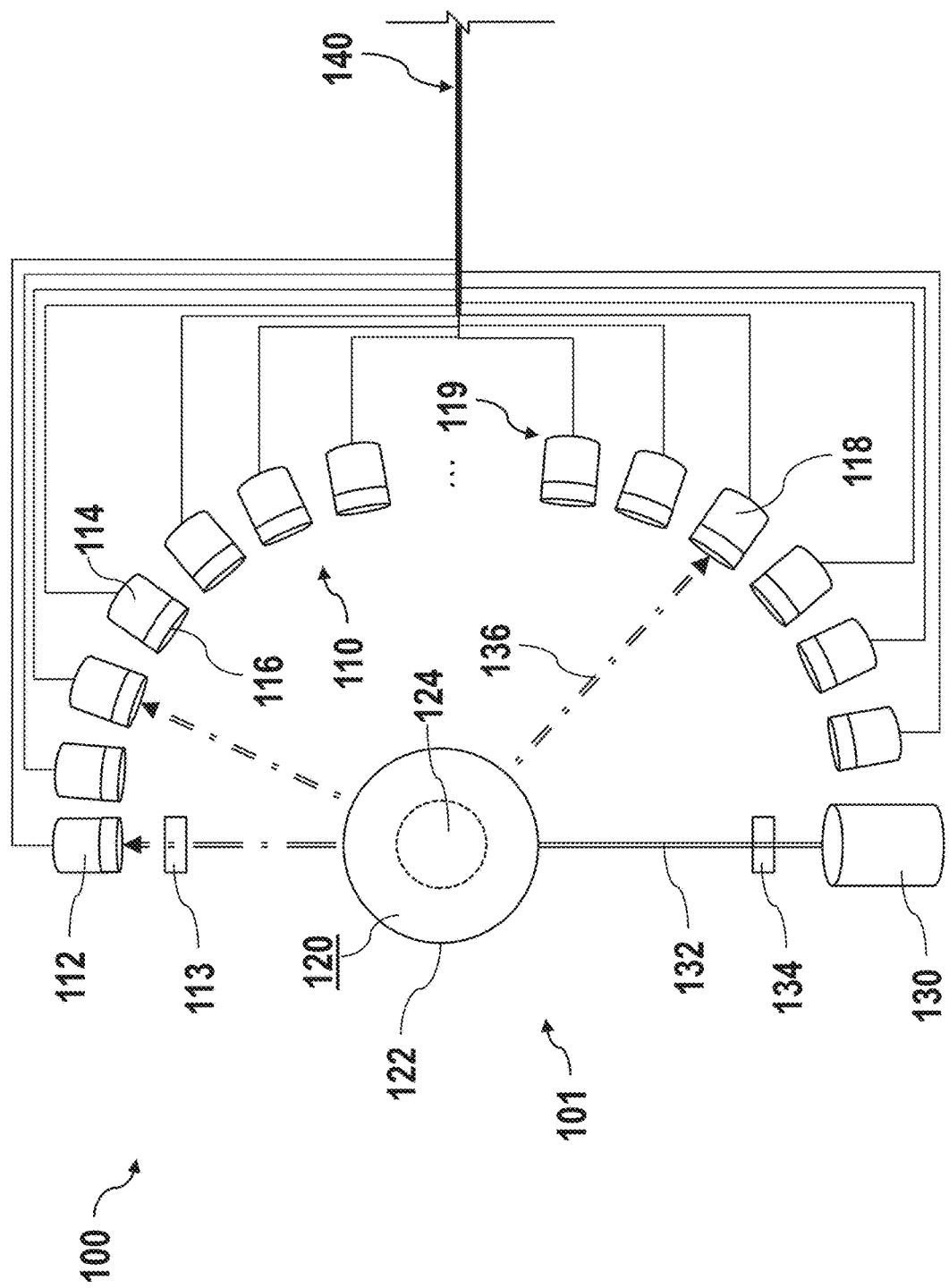
FIGS. 1A-1B are diagrammatic illustrations of a multichannel angular spectrometer, in accordance with a first exemplary embodiment of the present disclosure.
Figure 1B:
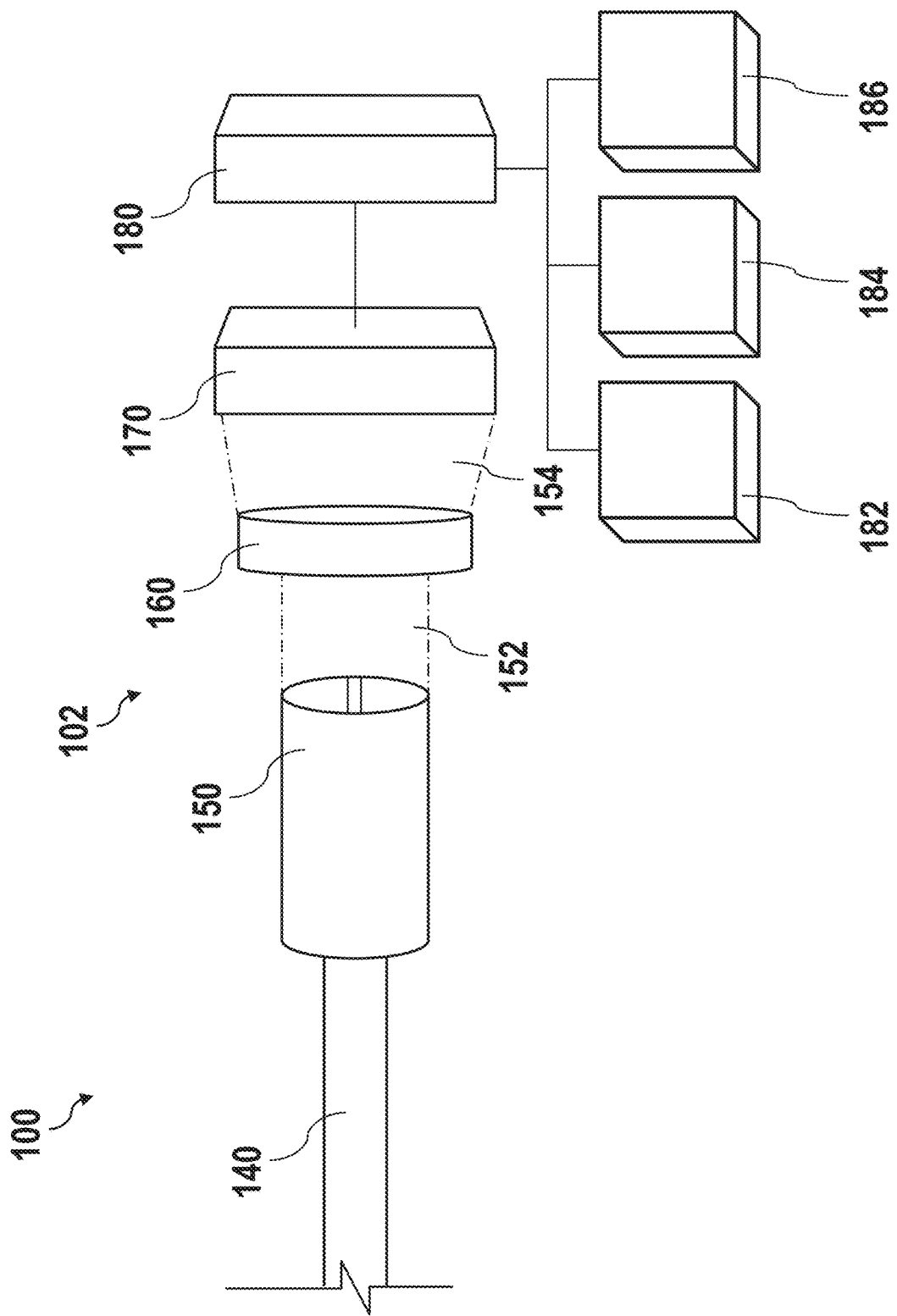

FIGS. 1A-1B are diagrammatic illustrations of a multichannel angular spectrometer 100, in accordance with a first exemplary embodiment of the present disclosure. FIG. 1A is a diagrammatic illustration of the optical system 101 of the multichannel angular spectrometer 100. FIG. 1B is a diagrammatic illustration of the detection and processing systems 102 of the multichannel angular spectrometer 100. Reference will be made to both figures in the following discussion. Where indicated below, certain repeating or duplicative elements have not been shown for ease of illustration. This should not be understood to limit the subject disclosure to the number and location of elements illustrated in the figures. It should be understood that additional numbers, types, and locations of elements, where discussed herein but not shown for brevity, are considered to be within the scope of the disclosure.

As shown collectively in FIGS. 1A-1B, a multichannel angular spectrometer ("spectrometer") 100 includes an array of fiber pickups 110 having an arcuate arrangement and focused about a sample volume 120. A broadband light source 130 is configured to illuminate a sample within the sample volume 120. At least one dispersion element 160 is in optical communication with the array of fiber pickups 110. An imaging sensor 170 is in optical communication with the array of fiber pickups 110. The imaging sensor 170 is configured to image the broadband light received by the array of fiber pickups 110 and dispersed by the at least one dispersion element 160. A processor 180 is in electrical communication with the imaging sensor 170. The processor 180 has a power supply 182 and computer-readable memory 184.

Turning to FIG. 1A in particular, the optical system 101 of the spectrometer 100 is shown. The optical system 101 includes an array of fiber pickups 110. The array 110 may include a plurality of fiber pickups 112, 118 having a desired orientation and arrangement. For ease of illustration, only two fiber pickups 112, 118 are labeled using reference characters. However, it should be understood that all illustrated fiber pickups shown in FIG. 1A may be referred to using reference character 118. Reference character 112 refers particularly to a fiber pickup at a 0° angle relative to the broadband light source 130.

The fiber pickups 112, 118 may be any suitable type and size of fiber pickup. In one example, this may include glass or fused-silica fibers, in particular UV-transparent fused silica fibers. The fiber pickups 112, 118 may be selected to provide a particular numerical aperture to the detection and processing systems 102, which in one example may be about 0.16. The fiber pickups 112, 118 may include any optical components for filtering, sizing, or directing the light received by the fiber pickups. For instance, a lens 116 may be positioned in front of each fiber ferrule 114. The lens 116 may focus incoming light into the fiber ferrule 114. In another example, one or more fiber pickups 112 may include a filter, such as a neutral density filter 113 to attenuate the intensity of light through the fiber pickup 112. Other filters, such as bandpass filters, color and absorptive filters, dichroic filters, and the like, may be included. In one example, the filter 113 may be particularly used with a fiber pickup 112 located at a 0° angle relative to the broadband light source 130, i.e., directly in front of the broadband light source 130. This may allow the spectrometer 100 to determine a baseline intensity of the broadband light 132 after propagating through the sample volume 120 and without significant attenuation, e.g., with trivial attenuation in a clear fluid, due to scattering. This, in turn, may allow the relative intensities of the light received by the other fiber pickups 112, 118 to be normalized. In another example, the filter 113 may be used with all of the fiber pickups 112, 118. For instance, a bright broadband source 130 may be used to illuminate the sample volume 120, and all of the fiber pickups 112, 118 may require a separate filter 113. In yet another example, a particular filter 113 may be used with one fiber pickup 112, while another filter 113 may be used with one or more additional fiber pickups 112, 118.

The array 110 may comprise any suitable shape, spacing, orientation, and number of fiber pickups 112, 118. In one example, the array 110 may have an arcuate shape, such as a semicircular or partially circular shape. In another example, the array 110 may have an elliptical or spiral shape, or any other suitable round shape. In another example, the arcuate shape may be three-dimensional, and may include spherical and ellipsoidal shapes, or portions thereof. The array 110 may comprise a plurality of fiber pickups 112, 118 positioned throughout the array shape. In one example, the fiber pickups 118 may be evenly distributed along the array shape, i.e., may be spaced evenly apart. In another example, some fiber pickups 118 may be positioned closer to one another than other fiber pickups 118, depending on the application. For instance, in applications where scattering may be concentrated at particular angles, the array 110 may include a higher density of fiber pickups 118 at the concentrated angles than at other, non-concentrated angles. Any suitable number of fiber pickups 118 may be included in the array 110. For example, there may be a fiber pickup 118 for each integer division of the angular range of the array 110, e.g., a fiber pickup corresponding to 1°, 2°, 3°, and so on. In another example, the number of fiber pickups 118 may correspond to the numerical aperture or angle of acceptance of each fiber pickup 118 relative to the angular range of the array 110. Thus, the entire angular range of the array 110 may be imagable by the fiber pickups. In one particular example, about 90 fiber pickups 118 may be used at approximately 2° spacing. For brevity in illustration, FIG. 1A shows fewer than 90 fiber pickups 118. However, any suitable number of fiber pickups 118 may be included within the scope of this disclosure.

The array of fiber pickups 110 may capture scattered light at a desired range of angles, depending on the shape of the array 110 and the number and position of fiber pickups 118. In one example, a semicircular array 110 may image a range of nearly 0° to 180°, or in some cases 2° to 178° relative to the direction of propagation of the broadband source 130. In this particular example, the use of about 90 fiber pickups 118 spaced at approximately 2° can provide the angular range. Fiber pickup 112 may be located at the 0° position in order to provide attenuation information, while the remaining fiber pickups 118 may be located at 2°, 4°, 6°, and so on, up to 178°. This range of angles may provide an angular resolution of about 2°, allowing the scattering Mueller matrix to be directly measured or indirectly calculated. In one example, a smaller angular range, or a combination of smaller angular ranges, may be desired.

The array of fiber pickups 110 may be focused about a sample volume 120. The sample volume 120 may be a volume at least partially enclosed by a sample volume housing 122. The sample volume housing 122 may be any suitable material capable of holding a sample 124 to be studied. In one example, the sample volume housing 122 may be made from a material that is transmissive to the desired spectrum range so that light from the broadband light source 130 can propagate through and be scattered out of the sample volume housing 122. This may include borosilicate glass, fused silica, sapphire, and the like. In one example, the sample volume housing 122 may not be transmissive to wavelengths outside of the desired range. The sample 124 may be any desired substance or material. In one example, the sample 124 may include water, such as ocean water. Thus, in one example, the sample volume housing 122 may be capable of containing liquid water.

The sample volume 120 may be located in the beam path of a broadband light source 130. The broadband light source 130 may be configured to illuminate the sample 124 within the sample volume 120. The broadband light source 130 may be any source suitable for operating within the desired spectral range. In one example, this may include broadband sources operating within the UV-VIS range, or about 400 nm-900 nm. Suitable broadband sources may include laser-driven phosphor light sources, white light LED sources, incandescent lights, fluorescent lights, high intensity discharge lamps, electric arc lamps, laser-driven arc lamps, and the like. In one example, a source with high intensity and even output across the spectral range may be used. This may include electric or laser-driven arc lamps. In one example, a 75-watt electric xenon arc lamp may be used. These sources may require significant energy input and may be less energy efficient than other sources. In another example, a combination of sources may be used in order to balance energy efficiency with intensity and even output considerations. For instance, a laser-driven phosphor source may be combined with one or more additional sources to create a balanced broadband source. Additional sources may include smaller arc lamps and/or the addition of LEDs at particular wavelengths to compensate for the unevenness of the laser-driven phosphor source.

The broadband light source 130 may include any optical components to shape, direct, or condition the light emitted. This may include collimating lenses or reflectors, optical fibers to direct the output to the sample volume 120, lens systems to create larger, smaller, or even intensity beams, and the like. In FIG. 1A, these components may simply be illustrated as the emitting end of an optical fiber in communication with the broadband light source 130. It should be understood that any combination of these components is included within the scope of this disclosure.

The broadband light source 130 may emit a beam 132 directed at the sample volume 120. In one example, the emitted beam 132 may be a collimated beam having a diameter several times the size of the output optical fiber. In one example, a diameter of the output optical fiber may be larger than a diameter of the fiber pickups 118, but not so large as to introduce unwanted angular divergence in the emitted beam 132. The angular divergence of the emitted beam 132 may be significantly less than the angular resolution of the spectrometer 100. For instance, where the angular resolution of the spectrometer 100 is 2°, the angular divergence of the emitted beam 132 may be less than 2°, in some cases an order of magnitude less. The diameter of the emitted beam 132 may be large enough to sufficiently illuminate a sample 124 within the sample volume 120. In one example, where an arc lamp is used as the broadband light source 130, an emitted beam diameter of 6,000 μm may be sufficient to illuminate the sample 124 and maintain a desirable power-to-cross-sectional area ratio.

In one example, the emitted beam 132 may be unpolarized light. In another example, the emitted beam 132 may be directed through one or more polarizers 134 to polarize the emitted beam 132 before it reaches the sample volume 120. This may include any combination of linear and/or circular polarizers. In one example, the polarizer 134 may be rotated to provide a plurality of polarization states in the emitted beam 132.

In operation, the emitted beam 132 may be directed to the sample volume 120. When incident upon the sample 124 to be measured, the emitted beam 132 may be scattered at one or more angles. The scattered beams 136 may propagate toward one or more of the fiber pickups 118. FIG. 1A shows two scattered beams 136 for simplicity and ease of illustration. However, the emitted beam 132 may be scattered in many directions not illustrated during illumination. The fiber pickups 118 may receive the incident scattered beams 136 at a receiving end 119 of the fiber pickups 118, which may propagate through the fiber pickups 118. The intensity of each scattered beam 136 may differ according to the material properties of the sample 124. For instance, a sample 124 having a quantity of carbon dioxide may produce scattered beams of different intensity at certain angles than a sample 124 having no carbon dioxide.

The fiber pickups 118 may be bundled together as fiber bundle 140. The scattered beams 136 received by all of the fiber pickups 118 may propagate through the fiber pickups 118 within the fiber bundle 140, where they may be directed to the detection and processing systems 102 of the spectrometer 100.

Turning to FIG. 1B, the detection and processing systems 102 are shown. The fiber bundle 140 containing the received light from the fiber pickups 118 may be directed to the systems 102 for detection and processing. The fiber bundle 140 may terminate in an emitting end 150 containing the array of fiber pickups 118. In one example, the fiber pickups 118 may be bundled in a horizontal array such that fiber pickups 118 corresponding to each successive angle are adjacent to one another across a horizontal axis. In another example, the fiber pickups 118 may be bundled in a vertical array. This may depend on the orientation and operation of the imaging sensor 170.

At least one dispersion element 160 is in optical communication with the array of fiber pickups 118. The at least one dispersion element 160 may operate to disperse the broadband light 152 received by the fiber pickups 118 and emitted at the emitting end 150 across the desired measurement spectrum. The broadband light 152 may propagate from the emitting end 150 to the at least one dispersion element 160 along an optical path. The at least one dispersion element 160 may include any suitable dispersion elements, including transmissive gratings, reflective gratings, prisms, grisms, and the like. In one operating example, a transmissive grating operating between 400 nm-900 nm was used. The transmissive grating provided good spectral resolution, but introduced spectral contamination by different diffraction orders. In such a case, the at least one dispersion element 160 may also include an order sorting filter to reduce unwanted diffraction orders. In another operating example, a dispersion prism was used to provide separation of the constituent wavelengths within the fiber bundle 140. The prism was found to disperse the subject wavelengths to a smaller degree than the transmissive grating, providing improved sensitivity of the spectrometer 100.

Dispersed light 154 may propagate through the at least one dispersion element 160 to the imaging sensor 170. Although not illustrated in FIG. 1B for ease of viewing, additional optical components such as mirrors, prisms, beam guides, and the like may direct the dispersed light 154 along one or more directions to the imaging sensor 170. The at least one dispersion element 160 may spatially disperse the wavelengths in each fiber pickup 118 across at least a portion of the imaging sensor 170. In a particular example, the light may be dispersed over substantially an entire length of the imaging sensor 170. The imaging sensor 170 may be any suitable imaging sensor or number of sensors for detecting the wavelengths, quantity, and intensities of light imaged by the spectrometer 100. In one example, this may include a plurality of sensors each dedicated to a portion of the angular range being measured. For instance, over a near-180° angular range, three sensors covering every 60° may be used, or two sensors covering each 90° may be used, and so on. In another example, a single imaging sensor 170 may be used to detect the entire angular range. In another example, different imaging sensors may be used at different angular locations within the angular range, depending on the sensitivity required and the intensity of the incident light. For example, if higher sensor sensitivity is required at a particular range of angular values, then a highly sensitive imaging sensor may be used over that range. If a lower sensitivity is required at other angular values, the other angular values may be measured using a different imaging sensor.

The imaging sensor 170 is configured to image the broadband light 152, 154 received by the array of fiber pickups 110 and dispersed by the at least one dispersion element 160. The imaging sensor 170 may be a monochrome imaging sensor having a high dynamic range capable of imaging across several orders of magnitude of intensity. In one example, one or more filters may be used to attenuate very bright signals over at least a portion of the imaging sensor 170 surface.

It should be understood that the imaging sensor 170 may include any necessary components for operation, including a power supply 182, housing and mounting components, filters, view windows, and the like.

A processor 180 is in electrical communication with the imaging sensor 170. The processor 180 may be any suitable computer processing element or combination of elements, including single and multi-core processors, local processor arrays, networked processor arrays, distributed computing environments, and the like. The processor 180 has a power supply 182 and computer-readable memory 184. The power supply 182 may include any suitable power supply, such as a battery, A/C power source, solar module, wind-generated power, water-generated power, and the like. The computer-readable memory 184 may include any amount and type of computer-readable memory necessary to perform the desired measurements. The processor 180 may be configured to receive measurement data taken by the imaging sensor 170. In one example, the measurement data may be stored within the computer-readable memory 184 for later analysis. In another example, the spectrometer 100 may include data transfer components 186 to transmit the measurement data to a networked computer storage. The data transfer components 186 may include any combination of wired data transfer components, such as Ethernet and serial data transfer components, wireless data transfer components, such as Wi-Fi, Bluetooth®, cellular, and satellite components, and the like. In one operating example, the spectrometer 100 was powered by a 12-volt DC power supply that could be operated with a battery pack or a direct cable connection. Data transfer may be performed using an RS-232 serial data interface compatible with a Sea-Bird Scientific DH4 data handler for data collection and storage.

It should be understood that any additional electronic or other computer-processing components necessary for operation of the processor 180 are included within the scope of this disclosure.

Referring to FIGS. 1A-1B, the operation of the spectrometer 100 may be as follows. A sample 124 may be placed within the sample volume 120. In one example, this sample 124 may be a liquid sample, such as ocean water. In such a case, the entire spectrometer 100 may be placed in fluid, in particular underwater, in order to perform continuous sampling of an ocean area. However, the spectrometer 100 may be used in any suitable location and with any desired sample. The broadband light source 130 may be operated to emit a beam 132 incident upon the sample 124. If polarized light is desired, the polarizer 134 may be operated to provide the desired state or states of polarized light upon the sample 124. The emitted beam 132, incident upon the sample 124, may be scattered by the sample 124 due to its material properties. The scattered beams 136 may propagate in a plurality of directions and at a plurality of angular values. The fiber pickups 118 within the array 110 may receive the scattered beams 136 incident upon the receiving end 119 of the fiber pickups 118. In one example, lenses 116 may direct the scattered beams 136 into the fiber ferrules 114. The emitted beam 132 may also propagate at a 0° angle of deviation to a fiber pickup 112 having a filter 113. The fiber pickup 112 may establish an attenuation level for the signal to be recorded. In one example, about 90 fiber pickups 118 at an angular separation of 2° may be used. The fibers 118 in the array 110 may be oriented toward the sample volume 120 in a semicircle.

The scattered beams 136 may propagate through the fiber pickups 118. The fiber pickups 118 may be bound together in a fiber bundle 140. The fiber bundle 140 may terminate at an emitting end 150 through which all of the scattered beams 136 may emerge as an arrayed broadband light beam 152. The broadband light beam 152 may be directed through at least one dispersion element 160, which may spatially separate the wavelengths in the broadband beam 152 across the desired wavelength range. In one example, this may include a separation of about 2 nm across a wavelength range of 350 nm-750 nm. Each fiber pickup 118 may emit a broadband light beam 152 corresponding to an angular value. For each angular value, the wavelength components between 350 nm and 750 nm may be dispersed. The resultant beam may be a dispersed light beam 154 wherein the scattered beam 136 from each fiber pickup 118 is spatially separated in one axial direction, for example, horizontally, while the wavelengths from each scattered beam 136 are separated in an orthogonal axial direction, for example, vertically. The dispersed beam 154 may be directed to an image sensor 170. Each spatially separated scattered beam 136 may be detected by the image sensor 170 along a separate axial column. For example, the scattered beam 136 corresponding to a 2° angular value may be detected along one axial column of the image sensor 170, while the scattered beam 136 corresponding to a 4° angular value may be detected along an adjacent or approximately adjacent axial column of the image sensor 170, and so on for all of the angular values. Each axial column may receive the wavelength-dispersed incident light for its particular angle across the wavelength range. A processor 180 may be configured to receive electronic data detected by the image sensor 170, and may store the data or transmit the data to a remote storage for further processing. The resultant data may indicate the intensity of light recorded across the measured wavelength range for every fiber pickup 118. An exemplary graph of this recorded data is discussed in greater detail with respect to FIG. 7, below.

The spectrometer 100 provides several improvements over other spectrometer designs currently known in the art. As an initial matter, the plurality of fiber pickups 118 located across the angular range allows the spectrometer 100 to image light scattered from all angles within the angular range in a single measurement. Moreover, the broadband quality of the light used to illuminate the sample 124 and the dispersion element 160 allow all of the wavelengths within the spectral range to be captured and separately imaged in a single measurement. The numerous fiber pickups 118 provide improved angular resolution over the prior art, all while imaging over a desired wavelength range and across a continuous plurality of angular values. This allows the spectrometer 100 to record substantial data useful for calculating the volume scattering function of a measured sample 124. Additionally, the simple and symmetric geometry of the design makes calibration easier and improves accuracy, since all of the optical path lengths for all scattering angles are identical.

Figure 2:
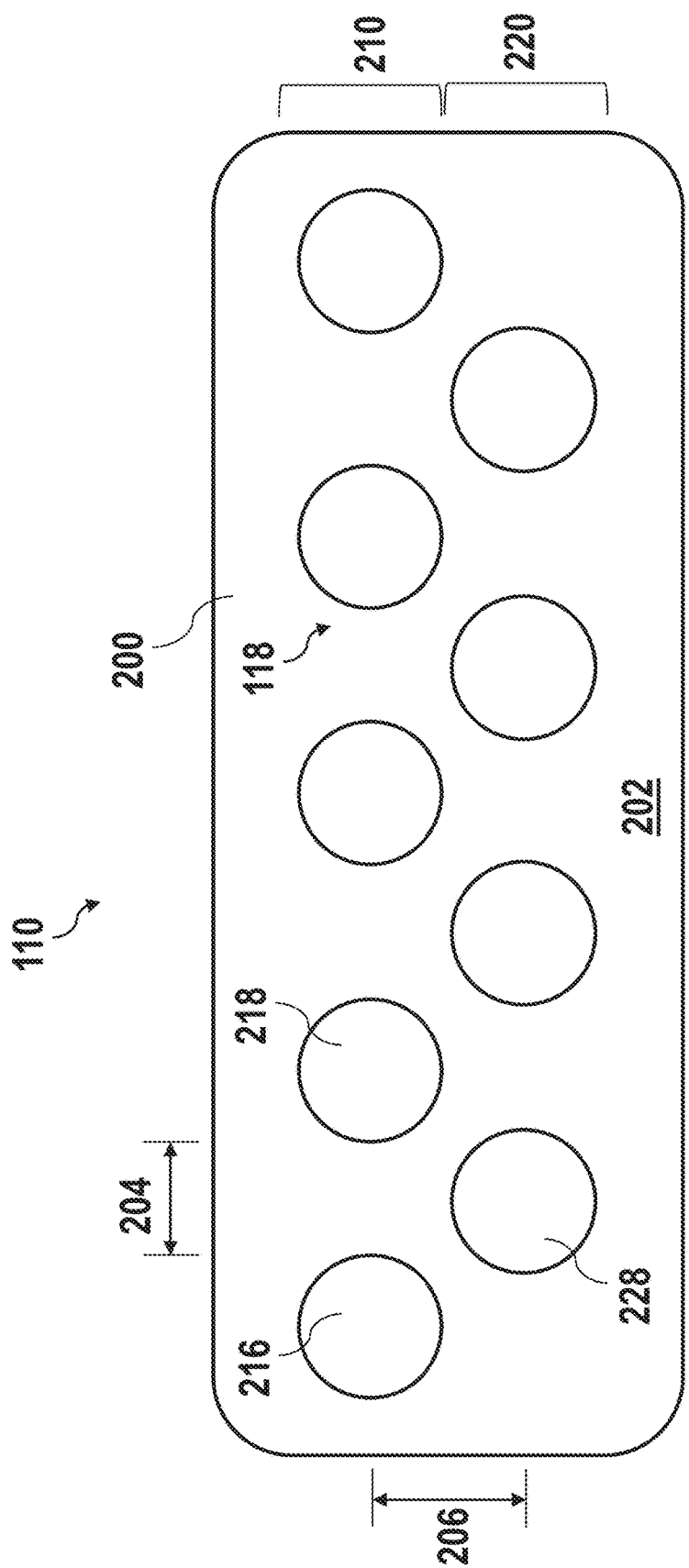
FIG. 2 is a cross-sectional illustration of a fiber array of the multichannel angular spectrometer, in accordance with the first exemplary embodiment of the present disclosure.

FIG. 2 is a cross-sectional illustration of a fiber array 110 of the multichannel angular spectrometer 100, in accordance with the first exemplary embodiment of the present disclosure. As shown in FIG. 2, the plurality of fiber pickups 118 may be affixed in a fiber fixture 200. The fiber fixture 200 may be shaped according to the desired shape of the fiber array 110, discussed relative to FIG. 1A, above. For example, the fiber fixture 200 may have a generally semicircular shape from an overhead perspective so as to orient the fiber pickups 118 in a semicircle. An interior face 202 of the fiber fixture 200 may be oriented toward the sample volume 120, and the receiving ends 119 of the fibers 118 may be positioned at the interior face 202. The interior face 202 may be a smooth surface. The fiber fixture 200 may be made from any suitable material, including metal, plastic, wood, ceramic, and the like. In one example, the interior face 202 may include an anti-reflection material, such as an anti-reflection coating, to prevent reflected light from being detected by the spectrometer 100.

The fiber pickups 118 may be spaced and oriented as described relative to FIG. 1A. In one example, horizontally adjacent fibers 216, 218 may have no or very little horizontal space 204 between them. This may allow an amount of crosstalk between adjacent fibers 216, 218. To reduce or eliminate crosstalk, there may be a horizontal space 204 between two horizontally adjacent fibers 216, 218. The horizontal space 204 may be measured between any suitable points, for instance between the two outermost points on each fiber pickup 216, 218 as shown. Alternatively, the horizontal space 204 may be measured as the distance between the centers of two adjacent fiber pickups 216, 218. In one example, the horizontal space 204 may be a portion of the diameter of the fibers 118. For instance, each fiber 118 may have a diameter of 100 microns and may have an edge-to-edge space 204 of 50 microns, about half the diameter. Any other suitable fractional space 204 may be used as desired. It should be understood that any suitable diameter of fibers 118 may be used, depending on the construction.

In one example, the fiber array 110 may include a single horizontal row 210 of fibers 118. In another example, the fiber array 110 may include a plurality of vertical rows 210, 220 of fibers 118. Two vertical rows 210, 220 are shown in FIG. 2. However, it should be understood that any number of rows may be included. The fibers 118 in subsequent rows 220 may be positioned relative to the fibers 118 in the first row 210. For instance, as shown in FIG. 2, fibers 118 in the second row 220 may be horizontally offset from fibers 118 in the first row 210, such that the second row 220 is located between the horizontal spaces 204 of the first row 210. Where the second or subsequent rows 220 of fibers 118 are offset from the first row 210, this may limit or reduce blooming caused by bright wavelengths. A fiber 228 in the second row 220 may receive a portion of the light between adjacent fibers 216, 218 in the first row 210. There may be a vertical space 206 between fibers 216, 228 in adjacent rows 210, 220. The vertical space 206 may be measured either as an edge-to-edge distance or as a center-to-center distance, as is shown in FIG. 2. In one example, the vertical space 206 may be smaller than the diameter of the fibers 118 and may be smaller than the horizontal space 204.

Figure 3B:
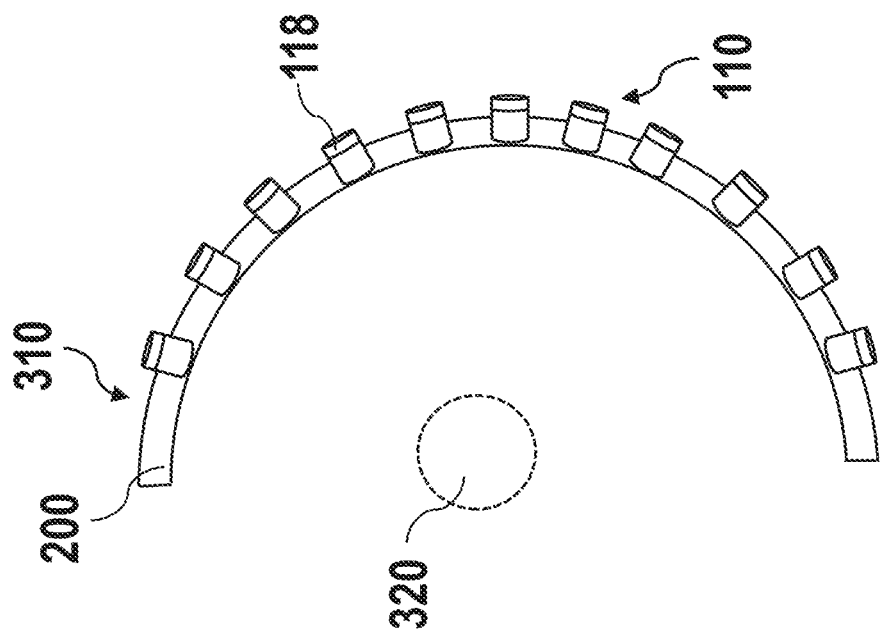
FIGS. 3A-3B are diagrammatic illustrations of arcuate fiber array configurations of the multichannel angular spectrometer, in accordance with the first exemplary embodiment of the present disclosure.
Figure 3A:
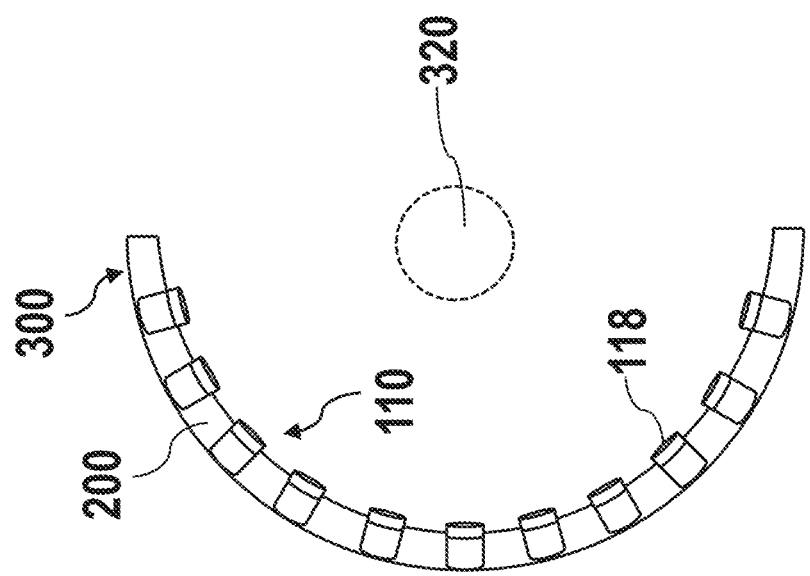

FIGS. 3A-3B are diagrammatic illustrations of arcuate fiber array configurations of the multichannel angular spectrometer 100, in accordance with the first exemplary embodiment of the present disclosure. FIG. 3A illustrates a concave fiber array configuration 300. FIG. 3B illustrates a convex fiber array configuration 310. Referring to FIG. 3A, the fiber array 110 is shown, with the plurality of fiber pickups 118 oriented within the fiber fixture 200. In a concave array configuration 300, the fiber pickups 118 are oriented toward a central point 320 approximately at the center of curvature of the fiber fixture 200. Thus, the fiber pickups 118 may receive scattered light corresponding to a plurality of scattering angles relative to the central point 320. Referring to FIG. 3B, the fiber array 110 is shown with the plurality of fiber pickups 118 oriented outwardly along the curvature of the fiber fixture 200. Rather than being oriented toward an inward sample volume, the fiber pickups 118 are oriented outwardly away from a central point 320. In this convex fiber array configuration 310, the fiber pickups 118 may correspond to incidence angle relative to the central point, i.e., they may receive light that would be incident upon the central point 320 at a particular angle, rather than light scattered from the central point 320 at a particular angle. In one example, a combination of concave and convex fiber array configurations 300, 310 may be used. This may include one or more concave fiber fixtures 200 and one or more convex fiber fixtures 200 combined to create a desired curved pattern. In one example, the fiber array configurations 300, 310 may be flexible, adjustable, or reconfigurable.

In operation, the convex fiber array configuration 310 may be used together with an aircraft or underwater glider. The convex fiber array configuration 310 may allow the creation of an angle-dependent spectral map along the fiber arc axis of orientation.

Figure 4A:
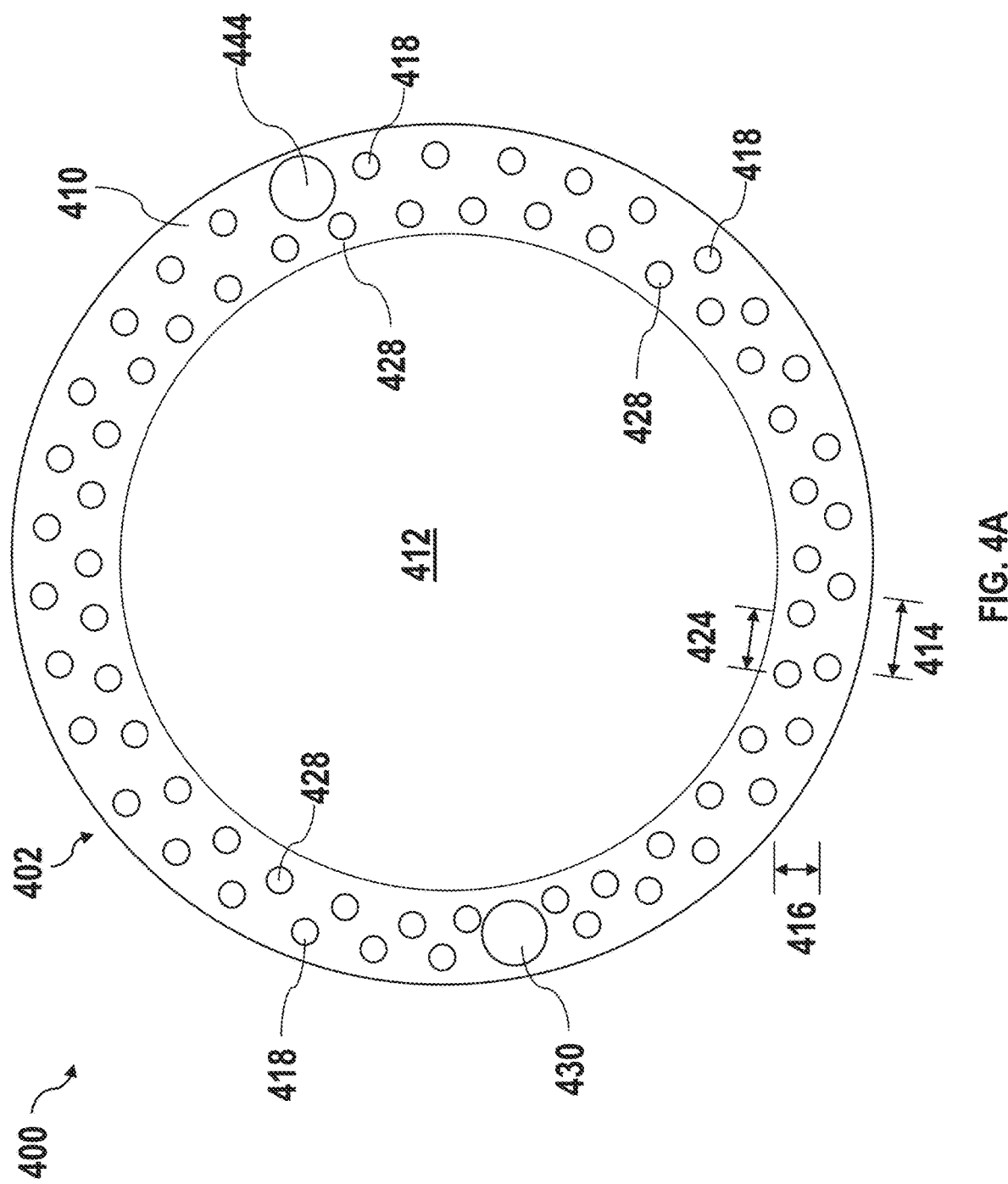

FIGS. 4A-4B are diagrammatic illustrations of an in-fluid multichannel angular spectrometer ("in-fluid spectrometer") 400, in accordance with a second exemplary embodiment of the present disclosure. FIG. 4A is an overhead illustration of the optical system 402 of the in-fluid multichannel angular spectrometer 400. FIG. 4B is a side view illustration of the curved reflector system 404 of the in-fluid multichannel angular spectrometer 400. The in-fluid spectrometer 400 may include component parts, structures, and functions like those described relative to FIGS. 1A-3B, above. Unless indicated otherwise, it may be understood that component parts bearing the same name are the same as those described above. The in-fluid spectrometer 400 may additionally be understood more fully with reference to FIGS. 4A-6, below.

The term "in-fluid" as used herein may refer to use and operation of any of the described subject matter within any type, volume, and composition of fluids, including gas and liquid fluid, in whole or in part. Reference may be made herein to water-borne applications by way of example, and not as a limitation. Application within any suitable fluid should be understood to be within the scope of the subject disclosure.

An in-fluid spectrometer 400 includes a housing 500 having a watertight interior volume 510 and an open sample volume 450. A reflector dish 440 is located within the open sample volume 450. A reflective face 442 of the reflector dish 440 is curved about an axis of curvature 600. A broadband light source 430 is located within the watertight interior volume 510 and configured to illuminate a sample 452 within the open sample volume 450. An emitted beam from the broadband light source propagates in a direction perpendicular to the axis of curvature to illuminate the sample. A plurality of fiber pickups 418, 428 are located within the watertight interior volume 510 and arranged radially about the reflector dish 440. The plurality of fiber pickups 418, 428 are oriented parallel to the axis of curvature 600 of the reflector dish 440. The plurality of fiber pickups 418, 428 are configured to receive broadband light scattered by the illuminated sample 452 and reflected by the reflective face 442 of the reflector dish 440. At least one dispersion element is located within the watertight interior volume 510 and in optical communication with the plurality of fiber pickups 418, 428. An imaging sensor is located within the watertight interior volume 510 and in optical communication with the plurality of fiber pickups 418, 428. The imaging sensor is configured to image the broadband light received by the plurality of fiber pickups 418, 428 and dispersed by the at least one dispersion element. A processor is located within the watertight interior volume 510 and in electrical communication with the imaging sensor. The processor has a power supply and computer-readable memory.

Referring particularly to FIG. 4A, the optical system 402 of the in-fluid spectrometer 400 is shown. The optical system 402 may include a plurality of fiber pickups 418, 428 fixed within a fiber ring 410. The fiber pickups 418, 428 may be as described relative to FIGS. 1A-3B, above, with the exception that each fiber pickup 418, 428 may not require a focusing lens due to the reflector dish 440 shown in FIG. 4B. The fiber pickups 418, 428 may be positioned within the fiber ring 410 according to the desired angular resolution, for instance, every 1° or every 2°. In one example, there may be a plurality of rows of fiber pickups 418, 428 within the fiber ring 410. For instance, a first row may include fiber pickups 418 located toward an outer edge of the fiber ring 410. A second row may include fiber pickups 428 located closer toward an inner edge of the fiber ring 410. Subsequent rows may likewise be positioned in varying degrees relative to the inner and outer edges of the fiber ring 410, depending on the implementation of the in-fluid spectrometer 400. As described above relative to FIG. 2, adjacent fiber pickups in each row may have a horizontal spacing 414, 424, respectively, and pickups 418, 428 in adjacent rows may have a vertical spacing 416.

The fiber pickups 418, 428 may be oriented in alignment with the fiber ring 410. In other words, the receiving face of each fiber pickup 418, 428 may be oriented in the same direction as the fiber ring 410. As shown in FIG. 4A, the fiber ring 410 may have a generally circular shape along a plane parallel with the drawing sheet, i.e., when viewed from overhead or underneath. As shown in FIGS. 4A and 4B, the fiber ring 410 may have a generally flat face in an orthogonal plane, i.e., coming out of the drawing sheet in FIG. 4A. The fiber pickups 418, 428 may be oriented along the axis extending out of the sheet. The fiber ring 410 may generally be of rigid construction and may be formed from any suitable materials, including metal, plastic, wood, ceramic, and the like. In one example, the fiber ring 410 may have a circular or substantially circular shape, as shown in FIG. 4A. In another example, the fiber ring 410 may have any other desired shape, including semicircular, arcuate, linear, polygonal, or any combination thereof.

A stray light shield 412 may be positioned within an interior portion of the fiber ring 410. The stray light shield 412 may prevent unwanted light or reflections from entering the sample volume 450 and being detected by the fiber pickups 418, 428. The stray light shield 412 may be sized and shaped to block at least a substantial portion of the interior of the fiber ring 410. In one example, the stray light shield 412 may be formed from the same material as the fiber ring 410. In one example, the stray light shield 412 may be formed as a unitary piece with the fiber ring 410. The stray light shield 412 and/or the fiber ring 410 may further include antireflective materials or coatings to prevent the introduction of unwanted light into the measurements being made.

A broadband light source 430 may be positioned within the fiber ring 410 and may be oriented in the same direction as the fiber pickups 418, 428. The broadband light source 430 may have any of the same characteristics described above relative to FIGS. 1A-1B.

As illustrated in FIG. 4A, the in-fluid spectrometer 400 may be capable of measuring scattered light from a range of angles between about −180° and +180°, depending on the number and location of fiber pickups 418, 428. It should be understood that the fiber pickups 418, 428 are not shown to scale. Nor are the full number of fiber pickups 418, 428 considered within the scope of this disclosure shown, for simplicity of illustration. As discussed above, a fiber pickup may be included for every desired angular value to be measured, for instance, at every 1° or 2° throughout the entire angular range. Also as discussed above, fiber pickups 418, 428 may be concentrated or spaced a greater distance apart at certain preferred ranges of angles if desired.

The fiber ring 410 and fiber pickup 418, 428 design of the in-fluid spectrometer 400 provides several improvements over other spectrometer designs. In addition to its large spectral and angular measurement range, as discussed above, the fiber ring 410 orients the fiber pickups 418, 428 in a much more compact arrangement. Since each fiber pickup 418, 428 is facing the same direction, less space is needed to assemble them all together. Additionally, the introduction of the reflecting dish 440 removes the need for individually-lensed fibers. This allows the fiber pickups 418, 428 to be positioned closer together than other designs can allow. In turn, the cost to build, operate, and deploy the in-fluid spectrometer 400 is greatly improved relative to the art. Further still, the co-locating of all the fiber pickups 418, 428 along the same plane makes possible the use of optical filters and other elements in front of all of the pickups 418, 428 at the same time, which simplifies the implementation of such elements. This is explained in greater detail in FIG. 9, below. Still further, the utilization of the reflecting dish 440 allows adjacent angular channels to overlap at least to a degree. This may improve channel packing density.

In one example, the fiber ring 410 may further include a broadband source exit port ("exit port") 444. The exit port 444 may be located opposite the broadband light source 430 on the fiber ring 410 and may be sized and shaped substantially similar to the broadband light source 430. In operation, broadband light that is not scattered by the sample may be allowed to exit the in-fluid spectrometer 400 through the exit port 444. This may prevent the light from re-entering the sample volume and being measured. This is shown in greater detail in FIG. 4B, below.

Referring to FIG. 4B, the optical system 402 of the in-fluid spectrometer 400 is shown from a side view in operation with the curved reflector system 404. The setup illustrated in FIG. 4B shows the optical system 402 under laboratory conditions to more easily demonstrate the principles of operation, and does not fully describe an in-situ optical system 402 or in-fluid spectrometer 400. This is shown in greater detail in FIGS. 5A-5B, below. The optical system 402 is oriented such that the fiber pickups 418, 428 and the broadband light source 430 shown in FIG. 4A face a reflector dish 440. The reflector dish 440 may be curved about an axis of curvature 600. In one example, the fiber pickups 418, 428 and the broadband light source 430 may be oriented parallel to the axis of curvature 600.

The reflector dish 440 may be located within an open sample volume 450, shown more fully in FIGS. 5A-5B, below. The reflector dish 440 may have a curved shape with any suitable type and degree of curvature. The curved shape may include any conical shapes, such as parabolic, circular, elliptical, or hyperbolic, and the like. The reflector dish 440 may be curved about at least a portion of the axis of curvature 600 to create a geometric solid. In other words, the reflector dish 440 may be shaped as at least a portion of a paraboloid, spheroid, ellipsoid, and so on. In one example, the reflector dish 440 may be a complete geometric solid shape, for instance, a paraboloid. In another example, the reflector dish 440 may be a partial geometric solid shape. In one operating example, a paraboloid shape was used, which enabled scattered broadband light to be reflected from the reflector dish 440 into the fiber pickups 418, 428. This is described in greater detail in FIG. 6, below.

The reflector dish 440 may be any suitable size, and may be at least the circumference of the fiber ring 410. The reflector dish 440 may be made from any suitable material having high reflectivity in the desired wavelength range, which may be between about 350 nm-750 nm. In one example, the reflector dish 440 may include a surface coating to protect against corrosion from ocean water or other environmental elements. A reflective face 442 of the reflector dish 440 may reflect incident light according to the shape and material properties of the reflector dish 440.

A volume outside of the optical system 402 may be described as an open sample volume 450. The open sample volume 450 may not be contained or housed, and in some cases may be exposed to ambient conditions. This may allow a sample 452 to be placed or flow into a portion of the open sample volume 450 located within the reflector dish 440. For example, when used in an ocean environment, ocean water may flow in and out of the open sample volume 450 to allow for measurement of the ambient ocean water environment. In one example, a fluid pump may be used in conjunction with the in-fluid spectrometer 400 to provide and exchange a desired volume of sample material.

The broadband light source 430 shown in FIG. 4A may be configured to emit a beam of broadband light 432 into the open sample volume 450. In one example, the emitted beam 432 may propagate in an initial direction parallel with the axis of curvature 600. The emitted beam 423 may be an uncollimated beam. The emitted beam 432 may reflect off of the reflector dish 440 in a direction perpendicular to the axis of curvature 600, and may illuminate the sample 452, which may cause the emitted beam 432 to scatter in a plurality of angular directions. The scattered beams 434 may propagate toward the reflector dish 440 and may reflect upwards toward the plurality of fiber pickups 418, 428. This is explained in greater detail in FIG. 6. The portion of the beam 432 that is not scattered may reflect off of the reflector dish 440 and into the exit port 444, as described above. This may help to reduce unwanted stray light within the measurement.

Figure 5A:
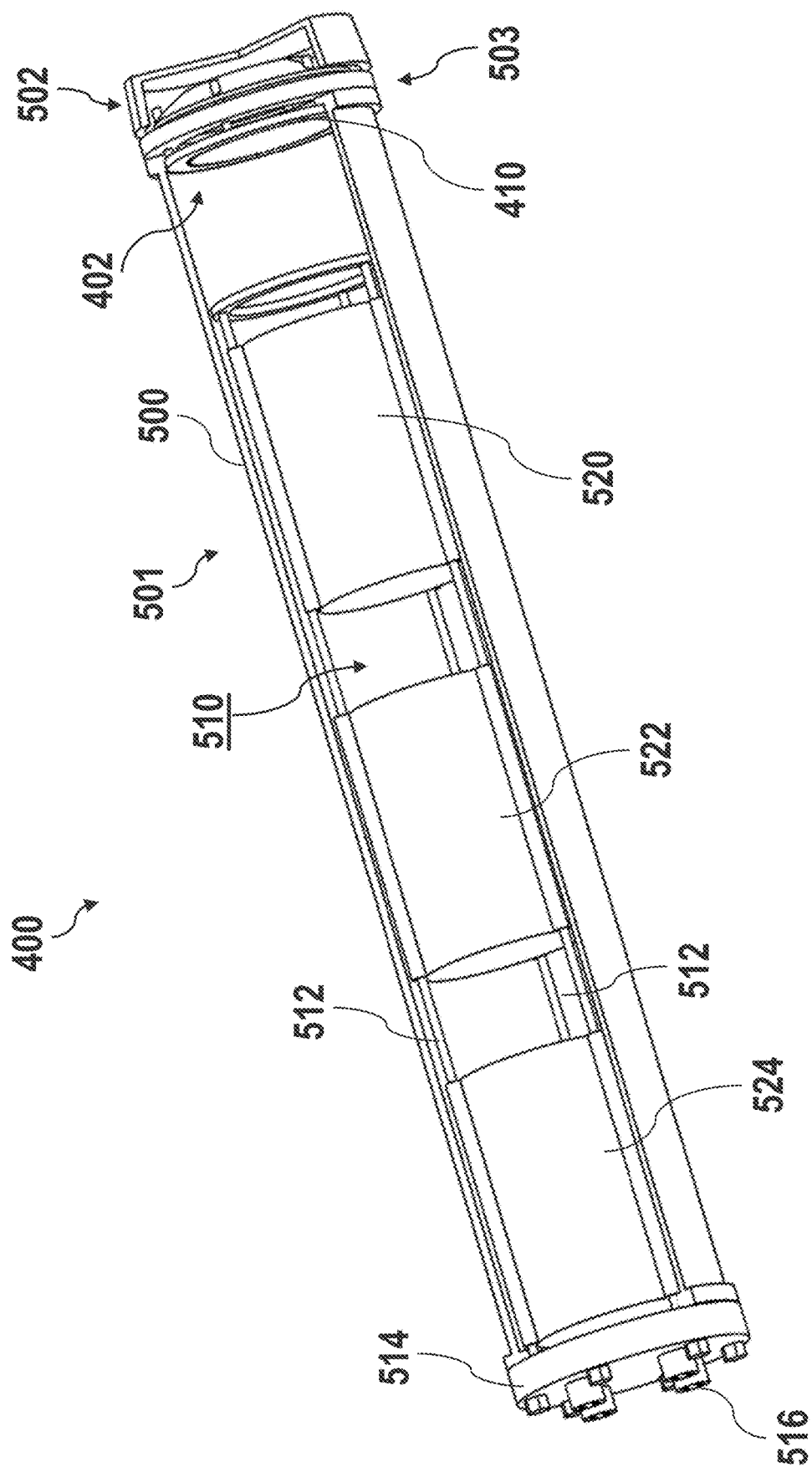

FIGS. 5A-5B are illustrations of the housing 500 of the in-fluid multichannel angular spectrometer 400 in partial cross, in accordance with the second exemplary embodiment of the present disclosure. FIG. 5A illustrates the component systems 501 within the housing 500. FIG. 5B is a close-up illustration of the curved reflector system 502 within the housing 500. FIGS. 5A-5B may be understood with reference to FIGS. 1A-4B, above.

The in-fluid spectrometer 400 includes a housing 500 having a watertight interior volume 510. The housing 500 may completely enclose the watertight interior volume 510 to prevent water or other environmental elements from entering the watertight interior volume 510. The housing 500 may be formed from any suitable material for use in water environments, particularly in ocean environments, including metal, plastic, and the like. In one example, the housing 500 may be rated to an in-fluid depth of at least 300 meters submersible and 50 meters operational. In one operating example, an anodized aluminum 6061 cylindrical housing, as illustrated in FIG. 5A, may be used. The housing 500 may have a diameter of about 6 inches and a length less than 3 feet to enable it to fit into subsea equipment cages generally.

The watertight interior volume 510 may include a plurality of component subsystems 520, 522, 524 and supporting fixtures 512, along with the optical system 402. The optical system 402 may be located at a viewport end cap 503 of the housing 500. The viewport end cap 503 may provide a seal at the viewport end, including by providing a transmissive viewport window, shown in FIG. 5B. The fiber ring 410 may be oriented in parallel along the axial length of the housing 500 and directed toward the curved reflector system 502. The distance between the fiber ring 410 and the reflector system 502 may be adjustable, for instance, using optical posts to mount the fiber ring 410 within the housing 500. The fiber pickups 418, 428 may face outward from the housing 500 to receive light from the reflector system 502. In one example, a spectrometer submodule 520 may be located within the watertight interior volume 510 and adjacent to the optical system 402. The spectrometer submodule 520 may include the fiber bundle, at least one dispersion element, imaging sensor, and other optical components necessary for operation of the optical aspects of the in-fluid spectrometer 400. The components within the spectrometer submodule 520 may include any of the components described relative to FIG. 1B, above. In one example, the optical submodule 520 may include a housing to protect the optical components therein and reduce unwanted light or other noise in the measurements. The fiber pickups 418, 428 located at the viewport end cap 503 of the housing 500 may be connected, by fiber optic cable in a fiber bundle, to the spectrometer submodule 520. These are not illustrated for ease of viewing, but should be understood to be included within the scope of the disclosure.

In one example, a light source submodule 522 may also be located within the watertight interior volume 510. The light source submodule 522 may include any of the electrical and light source components necessary for operation of the broadband light source 430, including the broadband source itself, filters, attenuation components, collimation components, polarization components, a power source, and the like. The components within the light source submodule 522 may include any of the components described relative to FIG. 1A, above. The components within the light source submodule 522 may be connected to the fiber ring 410 by optical fiber mounted within the fiber ring 410 and in optical communication with the light source submodule 522. This optical fiber is not illustrated for ease of viewing, but should be understood to be included within the scope of the disclosure.

In one example, an electrical submodule 524 may also be located within the watertight interior volume 510. The electrical submodule 524 may include any necessary electrical components to operate the in-fluid spectrometer 400, including a processor, power supply, computer-readable memory, data transfer components, electrical wiring, and the like. Any components discussed relative to FIGS. 1A-1B may be included. Electrical wiring is not illustrated for ease of viewing, but should be understood to be included within the scope of the disclosure.

In operation, the components within the submodules 520, 522, 524 may operate in the same way as the analogous components described above. The at least one dispersion element may disperse light received and emitted by the fiber pickups 418, 428. The imaging sensor may image the broadband light received by the plurality of fiber pickups 418, 428 and dispersed by the at least one dispersion element. The processor may receive the electronic data detected by the imaging sensor and may store or transfer the data for further processing. In one operating example, the data acquisition was performed at a rate between 1 and 10 Hz.

The submodules 520, 522, 524 and any other components mounted within the watertight interior volume 510 may be fixed within the volume by any suitable means. In one example, this may include epoxy, welding, screws, bolts, and the like. In another example, a plurality of mounting rods 512 may extend through at least a portion of the length of the housing 500. The mounting rods 512 may provide points to which the submodules 520, 522, 524 and other components may be affixed. The mounting rods 512 may be adjustable, allowing any component to be easily moved or removed for inspection or replacement. In one example, three mounting rods 512 may be used. The third mounting rod is not shown in FIG. 5A due to the perspective. The mounting rods 512 may allow optical components to be aligned through minor adjustments. In one example, an electrical end cap 514 may be located opposite the viewport end cap 503 of the housing 500. The electrical end cap 514 may be connected to the mounting rods 512 to provide stability. The electrical end cap 514 and mounting rods 512 may thereby be removed from the housing 500 to allow for easy access and maintenance. The electrical end cap 514 may include additional components 516, for instance, electrical plugs for charging, sacrificial zinc anodes for preventing corrosion, and heat sink fins for controlling the internal temperature.

The in-fluid spectrometer 400 may further include additional sensors, for example temperature and depth sensors, which may provide data that may be useful when combined with the spectrometry measurements performed by the in-fluid spectrometer 400.

FIG. 5B is a close-up illustration of the curved reflector system 502. The viewport end cap 503 may terminate in a viewport window 530 which is optically transmissive to both the emitted broadband beam 432 and the desired wavelength range to be received by the fiber pickups 418, 428. Beyond the viewport end cap 503 is the open sample volume 450, which extends between the viewport end cap 503 and the reflector dish 440, as well as laterally away from the housing 500. Sample material 452 may flow through the open sample volume 450 and into the reflector dish 440 to be illuminated by the broadband light source 430. Surrounding an exterior portion of the reflector dish 440 may be a protecting shield 540. The protective shield 540 may prevent ocean water and other environmental elements from contacting the exterior portion of the reflector dish 440. The protective shield 540 may further prevent stray or unwanted light from entering into the in-fluid spectrometer 400. The protective shield 540 may be made from any suitable material as the housing 500, including anodized aluminum.

Figure 5C:
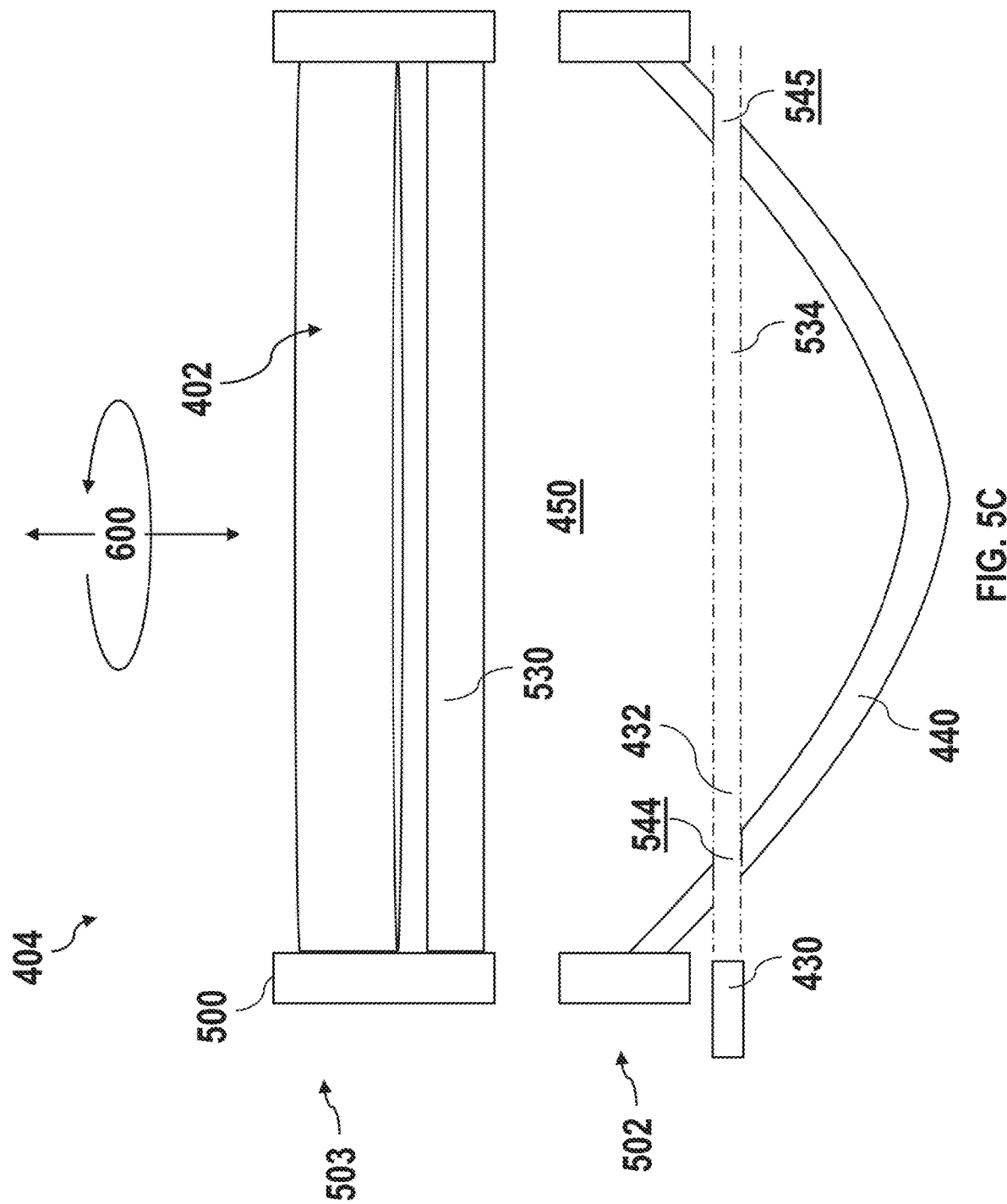
FIG. 5C is a diagrammatic illustration of an in-fluid multichannel angular spectrometer employing a collimated broadband light source, in accordance with the second exemplary embodiment of the present disclosure.

FIG. 5C is a diagrammatic illustration of an in-fluid multichannel angular spectrometer 400 employing a collimated broadband light source 430, in accordance with the second exemplary embodiment of the present disclosure. FIG. 5C may be better understood with reference to FIGS. 4A-5B, above. Illustrated are the curved reflector system 404 and the optical system 402 of the in-fluid spectrometer 400 as generally shown in FIG. 4B. The viewport window 530 is shown at the end of the viewport end cap 503 in optical communication with the fiber pickups 418, 428. The housing 500 surrounds the optical system 402 and the curved reflector system 502. The reflector dish 440 is shown having entrance port 544 and exit port 545.

In operation, the broadband light source 430 may be directed by way of optical fiber or other optical components to the entrance port 544. The broadband light source 430 may be collimated. The beam emitted from the broadband light source 430 may propagate in a direction perpendicular to the axis of rotation 600 to illuminate a sample within the open sample volume 450. Upon reaching the sample, the emitted beam 432 may scatter in a plurality of directions. The portion of the emitted beam 432 that is not scattered 534 may be directed through the exit port 545 and out of the curved reflector system 502. The scattered beams may reflect off of the reflector dish 440 and into the fiber pickups 418, 428.

FIG. 6 is a cross-sectional diagrammatic illustration of the curved reflector 440, in accordance with the second exemplary embodiment of the present disclosure. A small, close-up portion of the curved reflector surface is shown during operation of the in-fluid spectrometer 400 to illustrate the propagation of light through the sample 452 and into a fiber pickup 418. As illustrated in FIG. 4B, above, broadband light 432 is emitted from the broadband light source 430 in a direction parallel to an axis of curvature 600 of the curved reflector 440. The emitted light 432 is incident upon and illuminates a sample 452 within the open sample volume 450. The sample 452 causes the emitted light 432 to scatter in a plurality of angular directions. The scattered light 434 may propagate towards the reflective face 442 of the reflector dish 440 and be reflected by the reflector dish 440. The reflective face 442 is curved about the axis of curvature 600. Due to the curved shape of the reflective face 442, the scattered light 434 may be reflected back toward a plurality of fiber pickups 418, 428 in a direction parallel to the axis of curvature 600. The plurality of fiber pickups 418, 428 may be arranged radially about the reflector dish 440 and oriented parallel to the axis of curvature 600. The reflected light 436 may be received at a receiving end of the fiber pickup 418 and may propagate through the fiber pickup 418 as described above. The reflected light 436 received by the plurality of fiber pickups 418, 428 may be dispersed by at least one dispersion element and may be incident upon an imaging sensor as described above.

Referring to the optical characteristics of the reflector dish 440 and the fiber pickup 418, the reflector dish 440 may have a parent focal length 620, which may be defined as the on-axis distance at which collimated light reflected off of the reflector dish 440 will focus. The parent focal length may define the shape of the reflector dish 440. The reflected focal length or slant focal length 610 may be defined as the off-axis distance at which the incident beam will focus. In one example, any fiber pickup 418 may be positioned so that the receiving end of the fiber pickup 418 is at the intersection of the parent focal length and the reflected focal length. This may allow the fiber pickup 418 to receive the reflected beam 436 and propagate it through to the emitting end of the fiber pickup 418. A minimum reflected focal length 610 value may be the distance at which the width of the beam of scattered light 434 is focused on the fiber pickup 418 at the numerical aperture of the fiber pickup 418. This may prevent the loss of light from the fiber pickup 418 from overflowing the numerical aperture.

Figure 7:
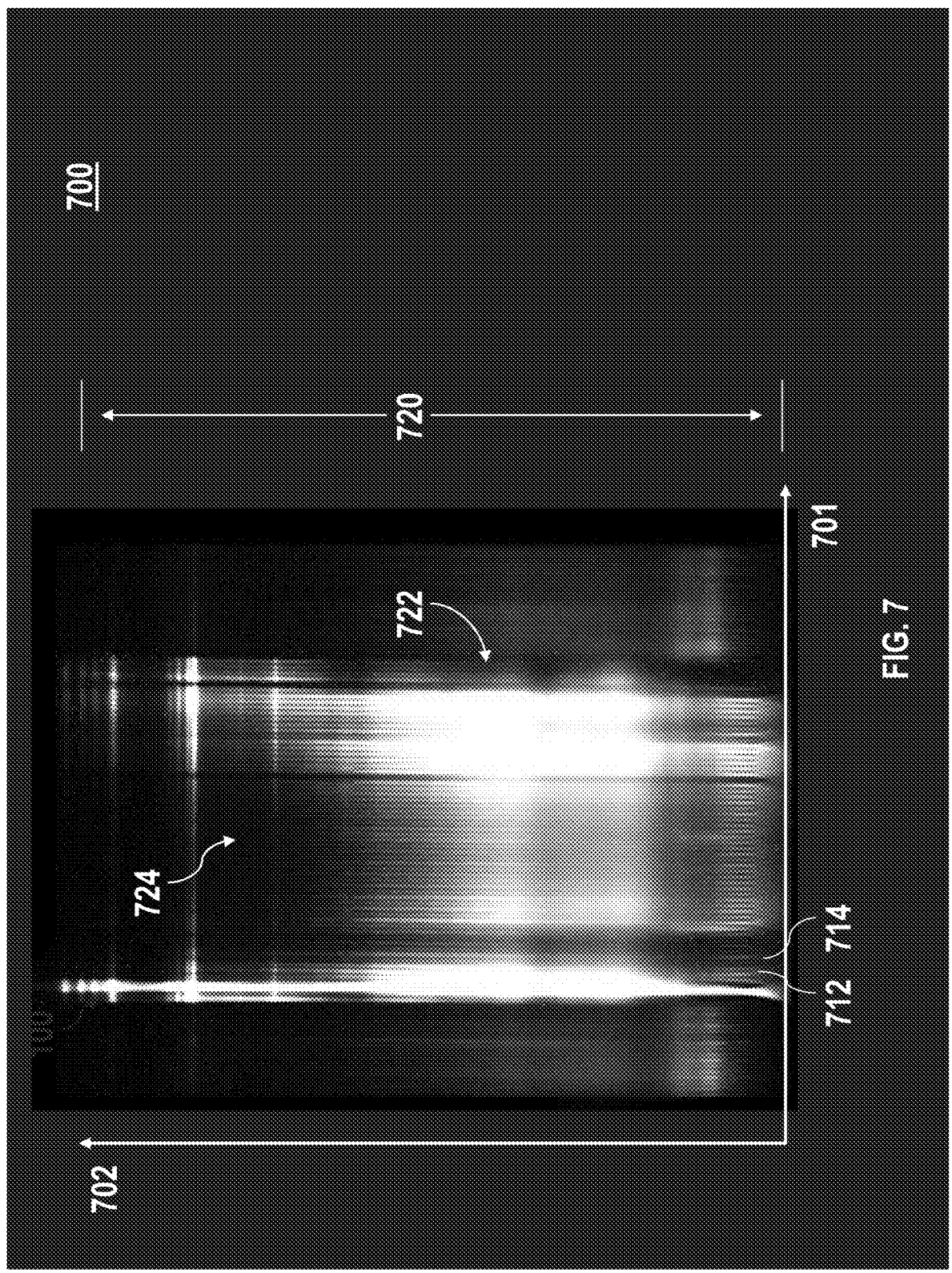
FIG. 7 is a graph showing the relative intensity over the spectral range for each fiber pickup, in accordance with the first exemplary embodiment of the present disclosure.

FIG. 7 is a graph 700 showing the relative intensity over the spectral range for each fiber pickup, in accordance with the first exemplary embodiment of the present disclosure. FIG. 7 may be more fully understood with reference to FIGS. 1A-6, above. As shown in FIG. 7, the electronic data received by the processor within the spectrometer 100 or the in-fluid spectrometer 400 may be represented visually. In one operating example, a measurement was made of Pacific Ocean water using the spectrometer 100 described above. The full measurement was acquired in fewer than 10 seconds, and in particular, 8 seconds. The data from the measurement was plotted across two axes 701, 702. The horizontal axis 701 indicates the angular position corresponding to each fiber pickup 118. The vertical axis 702 indicates the spectral or wavelength value for each angular position and across the entire imaged spectrum 720. Values toward the left end of the horizontal axis 701 indicate lower angular positions, such as 1°, 2°, 3°, and so on. Values toward the right end of the horizontal axis 701 indicate higher angular positions, such as 178°. Values toward the bottom end of the vertical axis 702 may indicate smaller wavelength values, while values toward the top end of the vertical axis 702 may indicate larger wavelength values. These may depend on the range of wavelengths being imaged.

As can be seen by the graph 700 in FIG. 7, each angular value is shown as a vertical line 712, 714 separated by one another by a space representative of the horizontal space between fiber pickups. Each vertical lines 712, 714 may indicate an intensity value along the imaged spectrum 720. For instance, large intensity values are shown as bright white portions 722 of the vertical lines 712, 714. Lower intensity values are shown as dark portions 724 of the vertical lines 712, 714. The brightness of the portions 722, 724 may correspond to the intensity of light detected by the imaging sensor and received as data by the processor. Adjacent vertical lines 712, 714 may correspond to adjacent fiber pickups 118, representing adjacent angular values.

It should be understood that a similar graph may be made using the in-fluid spectrometer 400.

Figure 8:
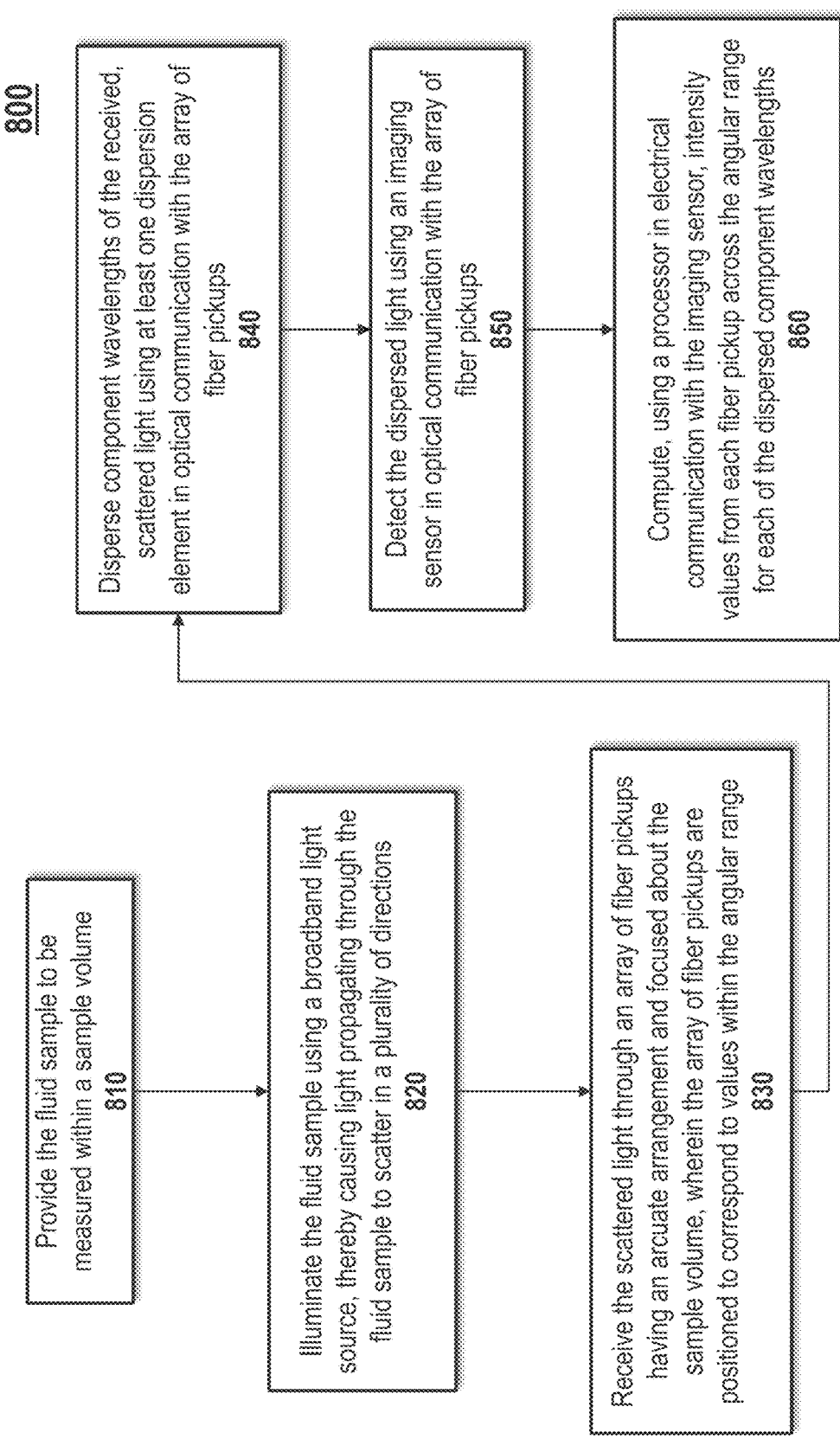
FIG. 8 is a flowchart illustrating a method for measuring light scattered by a fluid sample across an angular range, in accordance with the first exemplary embodiment of the present disclosure.

FIG. 8 is a flowchart 800 illustrating a method for measuring light scattered by a fluid sample across an angular range, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure. The method may further include any other features, components, or functions disclosed relative to any other figure of this disclosure, and may be more fully understood with reference to FIGS. 1A-7, above.

Step 810 includes providing the fluid sample to be measured within a sample volume. The fluid sample may be any desired fluid, for instance, ocean water. The fluid sample may be at least partially contained within a sample volume that is transmissive to the spectrum to be measured.

Step 820 includes illuminating the fluid sample using a broadband light source, thereby causing light propagating through the fluid sample to scatter in a plurality of directions. The broadband source may include wavelength components from across substantially all of the spectrum to be measured, for instance between 350 nm and 750 nm. The broadband light source may emit a broadband beam which may be collimated, attenuated, and/or filtered. The emitted broadband beam may be directed through an optical fiber to the sample.

Step 830 includes receiving the scattered light through an array of fiber pickups having an arcuate arrangement and focused about the sample volume, wherein the array of fiber pickups are positioned to correspond to values within the angular range. Each fiber pickup may correspond to an angular value, such as 1°, 2°, 4°, and the like. In one example, the scattered light may reflect off of a reflector dish curved about an axis of curvature. The reflector dish may have any curved solid geometric shape, including paraboloid, spheroid, ellipsoid, and hyperboloid. The reflected light may be directed into the array of fiber pickups at an angle parallel to the axis of rotation. In one example, the broadband light source and the fiber pickups may be positioned in a coplanar orientation parallel to the axis of rotation.

In one example, another step may include filtering the scattered light before it is received through the array of fiber pickups. The scattered light may be filtered with at least one filter selected from the set of: color filters, neutral density filters, and polarizing filters.

Step 840 includes dispersing component wavelengths of the received, scattered light using at least one dispersion element in optical communication with the array of fiber pickups. The at least one dispersion element may spatially disperse the light from each fiber within the array of fiber pickups.

Step 850 includes detecting the dispersed light using an imaging sensor in optical communication with the array of fiber pickups. Each vertical column of the imaging sensor may represent an angular value corresponding to a single fiber pickup. The component wavelengths dispersed by the at least one dispersion element may be represented vertically within each column.

Step 860 includes computing, using a processor in electrical communication with the imaging sensor, intensity values from each fiber pickup across the angular range for each of the dispersed component wavelengths.

In one example, another step may include graphically indicating the intensity values using a spectrograph plotting angular values against wavelength values. The angular values may be represented in a horizontal axis, while the wavelength values are represented in a vertical axis. The intensity values may be plotted against these orthogonal axes. The data received from each fiber pickup may be visually indicated as a vertical line, showing the intensity values over the range of wavelengths for the angular value represented by the fiber pickup.

In one example, another step may include converting the computed intensity data into one or more elements of a scattering Mueller matrix. For example, the intensity values, correlated to their wavelength and angular scattering values, may provide the necessary data to compute the P11 and P21 elements of the scattering Mueller matrix. This, in turn, may be useful for calculating the VSF of the measured sample. In another example, the intensity values may be used to calculate the bidirectional reflectance distribution function (BRDF) for the measured sample.

Figure 9:
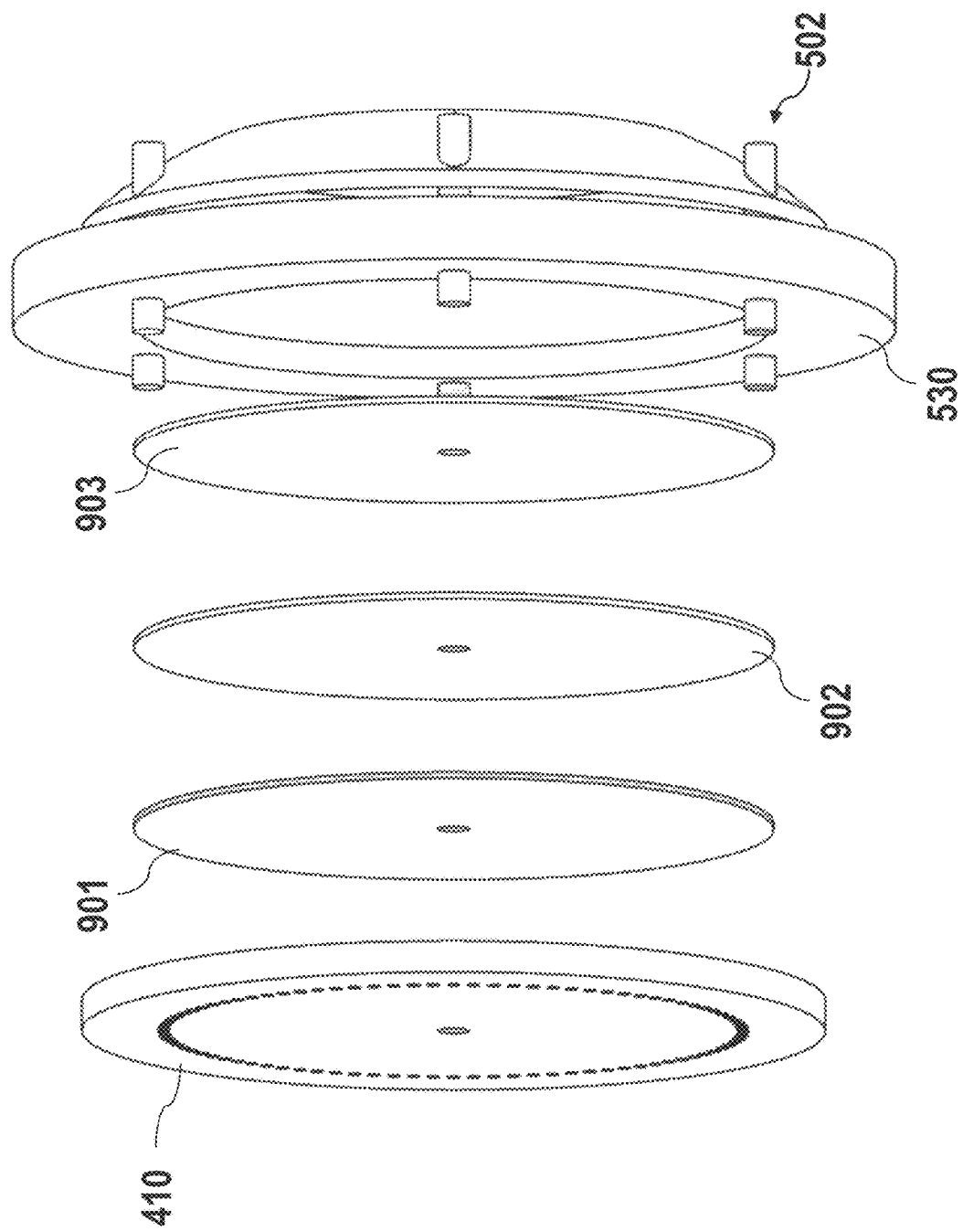
FIG. 9 is an exploded view of optical filters in use with the in-fluid multichannel angular spectrometer, in accordance with the second exemplary embodiment of the present disclosure.

FIG. 9 is an exploded view of optical filters 901, 902, 903 in use with the in-fluid multichannel angular spectrometer 400, in accordance with the second exemplary embodiment of the present disclosure. FIG. 9 is intended to provide a non-limiting example of filters and filter combinations that may be used with the in-fluid spectrometer 400 to provide enhanced and more varied information through the measurements made. Shown is the fiber ring 410 and the viewport window 530 in exploded view. Between these two components 410, 530 may be placed any number and kind of optical filters 901, 902, 903. The optical filters 901, 902, 903 may affect the light received by the fiber pickups 418, 428. For example, a color filter 901 may be used in front of the fiber pickups 418, 428 to filter out a particular wavelength or band of wavelengths in order to flatten the brightness profile of the beam incident upon the imaging sensor. For instance, if it is known that intensity measured around 450 nm is particularly high relative to other wavelengths, the 450 nm band may be filtered out by color filter 901 to attenuate the measured signal across all wavelengths. This may also flatten the dynamic range of the light incident upon the imaging sensor. As another example, a neutral density filter 902 may be used in front of the fiber pickups 418, 428 to reduce the intensity of light received by the fiber pickups 418, 428. The neutral density filter 902 may be a varying neutral density filter that provides a range of intensity reduction depending on the position of the filter. The level of color filter 901 and neutral density filter 902 may be taken into consideration when processing the resultant captured data. As another example, a polarizing filter 903 may be used in front of the fiber pickups 418, 428 to control the polarization of light received by the fiber pickups 418, 428. The polarizing filter 903 may be rotatable to allow varying polarization states through depending on the angle of rotation of the polarizing filter 903. In this way, polarization information may also be measured. For instance, a single linear polarizer at a single angle may allow the linear polarization information for all fiber pickups 418, 428 to be measured. The polarizer may be rotated to different angles in order to measure subsequent polarization information for each fiber 418, 428.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:
1. A multichannel angular spectrometer, comprising:
an array of fiber pickups having an arcuate arrangement;
a broadband light source configured to illuminate a sample within a sample volume, the broadband light source positioned in a coplanar orientation with the array of fiber pickups;
a reflector dish curved about an axis of curvature and positioned to reflect light scattered by the illuminated sample and into the array of fiber pickups;
at least one dispersion element in optical communication with the array of fiber pickups;

an imaging sensor in optical communication with the array of fiber pickups, wherein the imaging sensor is configured to image the broadband light received by the array of fiber pickups and dispersed by the at least one dispersion element; and a processor in electrical communication with the imaging sensor, the processor having a power supply and computer-readable memory.

2. The multichannel angular spectrometer of claim 1, wherein the array of fiber pickups is arranged in a semicircular shape.

3. The multichannel angular spectrometer of claim 1, wherein the fiber pickups are spaced apart at 2° intervals.

4. The multichannel angular spectrometer of claim 3, wherein an angular range of the array of fiber pickups is between 2° and 178°.

5. The multichannel angular spectrometer of claim 1, wherein the array of fiber pickups comprises at least two rows of fiber pickups.

6. The multichannel angular spectrometer of claim 1, wherein the at least one dispersion element is selected from the set of: transmissive gratings, reflective gratings, grisms, and prisms.

7. The multichannel angular spectrometer of claim 1, wherein the arcuate arrangement of the array of fiber pickups is at least partially oriented about a central point.

8. The multichannel angular spectrometer of claim 1, wherein the processor is configured to compute and graphically indicate intensity values detected from each fiber pickup using a spectrograph plotting angular values against wavelength values, wherein data from each fiber pickup is shown as a vertical line.

9. An in-fluid multichannel angular spectrometer, comprising:
   a housing having a watertight interior volume and an open sample volume;
   a reflector dish located within the open sample volume, wherein a reflective face of the reflector dish is curved about an axis of curvature;
   a broadband light source located within the watertight interior volume and configured to illuminate a sample within the open sample volume, wherein an emitted beam from the broadband light source propagates in a direction perpendicular to the axis of curvature to illuminate the sample;
   a plurality of fiber pickups located within the watertight interior volume and arranged radially about the reflector dish, wherein the plurality of fiber pickups are oriented parallel to the axis of curvature of the reflector dish, and wherein the plurality of fiber pickups are configured to receive broadband light scattered by the illuminated sample and reflected by the reflective face of the reflector dish;
   at least one dispersion element located within the watertight interior volume and in optical communication with the plurality of fiber pickups;
   an imaging sensor located within the watertight interior volume and in optical communication with the plurality of fiber pickups, wherein the imaging sensor is configured to image the broadband light received by the plurality of fiber pickups and dispersed by the at least one dispersion element; and
   a processor located within the watertight interior volume and in electrical communication with the imaging sensor, the processor having a power supply and computer-readable memory.

10. The in-fluid multichannel angular spectrometer of claim 9, wherein the reflector dish is shaped as a paraboloid.

11. The in-fluid multichannel angular spectrometer of claim 9, wherein the broadband light source and the plurality of fiber pickups are positioned coplanar with one another.

12. The in-fluid multichannel angular spectrometer of claim 9, further comprising at least one optical filter positioned in the optical path of the plurality of fiber pickups, and wherein the at least one optical filter is selected from the set of: color filters, neutral density filters, and polarizing filters.

13. The in-fluid multichannel angular spectrometer of claim 12, wherein the at least one optical filter is a polarizing filter, and wherein the polarizing filter is rotatable about the axis of curvature to allow light having a plurality of polarization states to be incident upon the plurality of fiber pickups.

14. The in-fluid multichannel angular spectrometer of claim 9, wherein the plurality of fiber pickups are spaced apart at intervals of 2° or less.

15. The in-fluid multichannel angular spectrometer of claim 9, wherein the plurality of fiber pickups comprises at least two rows of fiber pickups.

16. A method for measuring light scattered by a fluid sample across an angular range, comprising the following steps:
   providing the fluid sample to be measured within a sample volume;
   illuminating the fluid sample using a broadband light source, thereby causing light propagating through the fluid sample to scatter in a plurality of directions;
   reflecting the scattered light using a reflector dish curved about an axis of curvature, wherein the reflected light is reflected parallel to the axis of curvature and into an array of fiber pickups;
   receiving the scattered light through the array of fiber pickups having an arcuate arrangement and focused about the sample volume, wherein the array of fiber pickups are positioned to correspond to values within the angular range, and wherein the array of fiber pickups and the broadband light source are positioned in a coplanar orientation;
   dispersing component wavelengths of the received, scattered light using at least one dispersion element in optical communication with the array of fiber pickups;
   detecting the dispersed light using an imaging sensor in optical communication with the array of fiber pickups; and
   computing, using a processor in electrical communication with the imaging sensor, intensity values from each fiber pickup across the angular range for each of the dispersed component wavelengths.

17. The method of claim 16, wherein the angular range is between 2° and 178°.

18. The method of claim 16, wherein the reflector dish is shaped as a paraboloid.

19. The method of claim 16, further comprising the step of graphically indicating the intensity values using a spectrograph plotting angular values against wavelength values, wherein data from each fiber pickup is shown as a vertical line.

20. The method of claim 16, further comprising the step of filtering, with at least one filter, the scattered light before it is received through the array of fiber pickups, wherein the at least one filter is selected from the set of: color filters, neutral density filters, and polarizing filters.

\* \* \* \* \*